United States Patent
Sakurai

(10) Patent No.: US 9,019,552 B2
(45) Date of Patent: Apr. 28, 2015

(54) INFORMATION PROCESSING APPARATUS, SYSTEM AND METHOD FOR OUTPUTTING DATA TO A MEDIUM

(71) Applicant: Canon Kabushiki Kaisha, Tokyo (JP)

(72) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,734

(22) Filed: Dec. 5, 2013

(65) Prior Publication Data

US 2014/0168666 A1   Jun. 19, 2014

(30) Foreign Application Priority Data

Dec. 17, 2012 (JP) ................. 2012-274864

(51) Int. Cl.
*G06F 15/00* (2006.01)
*G06K 1/00* (2006.01)
*G06K 15/00* (2006.01)
*G06F 3/12* (2006.01)

(52) U.S. Cl.
CPC .............. *G06F 3/125* (2013.01); *G06F 3/1208* (2013.01); *G06F 3/1292* (2013.01); *G06F 3/1288* (2013.01)

(58) Field of Classification Search
CPC ..... G06F 3/125; G06F 3/1208; G06F 3/1292; G06F 3/1288
USPC .......................... 358/1.1, 1.18, 1.6
See application file for complete search history.

(56) References Cited

U.S. PATENT DOCUMENTS

| | | | |
|---|---|---|---|
| 2001/0010733 A1* | 8/2001 | Tomomatsu | 382/135 |
| 2007/0024875 A1* | 2/2007 | Oh | 358/1.2 |

FOREIGN PATENT DOCUMENTS

| | | |
|---|---|---|
| JP | 2009-53928 A | 3/2009 |
| JP | 2012-48343 A | 3/2012 |

* cited by examiner

*Primary Examiner* — Douglas Tran
(74) *Attorney, Agent, or Firm* — Fitzpatrick, Cella, Harper & Scinto

(57) ABSTRACT

Provided is an information processing apparatus that processes document data including a plurality of objects. The information processing apparatus acquires a size of an output medium to which an image based on the document data is output, acquires an output condition of an image based on the document data, extracts an object to be output alone to the output medium from among the plurality of objects included in the document data on a basis of the acquired size and the acquired output condition, and generates, on a basis of the extracted object, output data for outputting an image of the extracted object alone to the output medium based on the extracted object.

13 Claims, 29 Drawing Sheets

FIG. 3A

```
...
<h1>CHAPTER 1</h1>
<p>ABCDEFGHIJABCDE…</p>          602
<svg width="16cm" height="9cm">
...                              603
</svg>
<h1>CHAPTER 2</h1>               604
<p>KLMNOPQRSTKLMNO…</p>
<table border=1>
<caption>TABLE 1</caption>
<tr>                             605
<td>UVWXY</td><td>UVWXY</td>…
<td>ZABCD</td><td>ZABCD</td>…
</tr>
</table>
<h1>CHAPTER 3</h1>
<p>EFGHIJKLEFGHI…</p>
<img src="xxx.jpg" alt="xxx" />  606
...
```
601

FIG. 3B

```
<?xml version="1.0" encoding="UTF-8"?>
<package xmlns=…>
 <metadata xmlns:dc=…>
   ...
 </metadata>
 <manifest>
   ...
   <item id="fix" href="images/xxx.jpg" …>
   ...
 </manifest>
 <spine>
   ...                                      607
   <itemref idref="fix" properties="rendition:layout-pre-paginated"/>
   ...
 </spine>
</package>
```

Partial printing setting — 508

| Return | | |
|---|---|---|
| Terminal display minimum allowable character size | 6 pt | 509 |
| Terminal display maximum allowable demagnification ratio | 50% | 510 |
| Object: Table, Graphics, Image, Fixed | | 511 |
| Select output destination printer | PRN_A | 512 |
| Sheet size | A4 | 513 |
| Printing text character size | 10pts | 514 |
| Print to match sheet size | OFF | 515 |
| Integrated printing | ON | 516 |
| Front and rear printing | OFF | 517 |
| Display printed location in simple fashion | ON | 518 |
| Display reference destination | ON | 519 |

Preview ☑ — 520

Execute partial printing — 521

FIG. 6D

Select preview — 522

523

| Table 1 | | |
|---|---|---|
| UVWXY | UVWXY | UVWXY |
| ZABCD | ZABCD | ZABCD |

524 — 1/10   ← 525 →

Select print ☑ — 526

Number of selected objects: 2 — 527

Execute partial printing — 528

FIG. 18A

| Combination | Width | Height | Character size |
|---|---|---|---|
| 1 | 2inch | 3inch | 5pts |
| 2 | 2inch | 3inch | 6pts |
| 3 | 2inch | 3inch | 7pts |
| 4 | 3inch | 4.5inch | 5pts |
| 5 | 3inch | 4.5inch | 6pts |
| 6 | 3inch | 4.5inch | 7pts |
| 7 | 4inch | 6inch | 5pts |
| 8 | 4inch | 6inch | 6pts |
| 9 | 4inch | 6inch | 7pts |

FIG. 18B

| | | |
|---|---|---|
| Demagnification ratio | 50% | ~1301 |
| Target object | Table | ~1302 |
| Print format | PDF | ~1303 |
| Sheet size | A4 | ~1304 |
| Print character size | 10pts | ~1305 |
| Sheet size matching | OFF | ~1306 |
| Integrated printing | OFF | ~1307 |
| Front and rear printing | OFF | ~1308 |
| Printed location simple display | OFF | ~1309 |
| Reference destination display | OFF | ~1310 |

INFORMATION PROCESSING APPARATUS, SYSTEM AND METHOD FOR OUTPUTTING DATA TO A MEDIUM

BACKGROUND OF THE INVENTION

1. Field of the Invention

The present invention relates to an information processing system, an information processing apparatus, a control method, and a storage medium.

2. Description of the Related Art

With recent advances in high performance of portable terminals, there have been proposed portable terminals for displaying books in an electronic book format. Since there are portable terminals having various screen resolutions and various screen sizes, an electronic book is often provided in a reflow format in which a layout is changeable depending on a screen size or a character size.

An example of a reflow format for the electronic book includes a format called "EPUB" defined by IDPF (International Digital Publishing Forum). The EPUB is used as the standard format.

Japanese Patent Laid-Open No. 2012-48343 discloses a system that filters table items to be displayed for a table object larger than a display screen when a user views the table object with a portable terminal to thereby reconstruct the table object. Also, Japanese Patent Laid-Open No. 2009-53928 discloses a system that cuts out an image object for predetermined area unit and specifies the reading order of the cut-out image objects when the image object having a wider area than that of a display screen is displayed so that a user can read the image objects in order on a per predetermined area basis.

Assume that a user views document data including data represented in the reflow format using an information portable terminal. If the display screen of the information portable terminal is small, the user must extremely reduce an object such as a list table, an overall top-down view, or the like desired to be viewed on a single screen display to obtain an overall view or must reduce the object to a readable size and then scroll the reduced object in the vertical direction or in the horizontal direction. Thus, the resulting display becomes extremely hard to be read by a user or the entire object desired to be viewed on a single screen display cannot be viewed by a user.

The systems disclosed in Japanese Patent Laid-Open No. 2012-48343 and Japanese Patent Laid-Open No. 2009-53928 are systems that select and display a part of an object, which cannot be sufficiently displayed on a single screen display on a terminal display screen, so as to make the part of the object readily readable upon displaying electronic data. However, when an object desired to be viewed on a single screen display by a user on a display device does not fit within a single screen due to a screen size and a display condition, both systems cannot output the entire object so as to make it viewable within a single screen or within a single page (cannot perform listing-output).

SUMMARY OF THE INVENTION

The present invention provides an information processing apparatus that performs a listing-output of the entire object when an object desired to be viewed on a single screen display by a user on a display device does not fit within a single screen due to a screen size and a display condition.

According to an aspect of the present invention, an information processing apparatus that processes document data including a plurality of objects is provided that includes a size acquiring unit configured to acquire a size of an output medium to which an image based on the document data is output; a condition acquiring unit configured to acquire an output condition of an image based on the document data; an extracting unit configured to extract an object to be output alone to the output medium from among the plurality of objects included in the document data on a basis of the acquired size and the acquired output condition; and a generating unit configured to generate, on a basis of the extracted object, output data for outputting an image of the extracted object alone to the output medium.

According to the present invention, an information processing apparatus that performs a listing-output of the entire object when an object desired to be viewed on a single screen display by a user on a display device does not fit within a single screen due to a screen size and a display condition may be provided. Thus, the readability of an object which may be likely hard to be read on a display device may be improved while ensuring the brief graspability of the object.

Further features of the present invention will become apparent from the following description of exemplary embodiments with reference to the attached drawings.

BRIEF DESCRIPTION OF THE DRAWINGS

FIGS. 3A and 3B illustrate an example of reflow type document data.

FIGS. 4A and 4B illustrate screen display when reflow type document data is displayed on a portable terminal.

FIGS. 5A to 5D are exemplary illustrations of document data.

FIGS. 6A to 6D illustrate screens to be displayed on an input device of a portable terminal upon execution of document data acquisition software.

FIGS. 18A and 18B illustrate information used for data conversion processing performed by a storage server.

DESCRIPTION OF THE EMBODIMENTS

Figure 1:
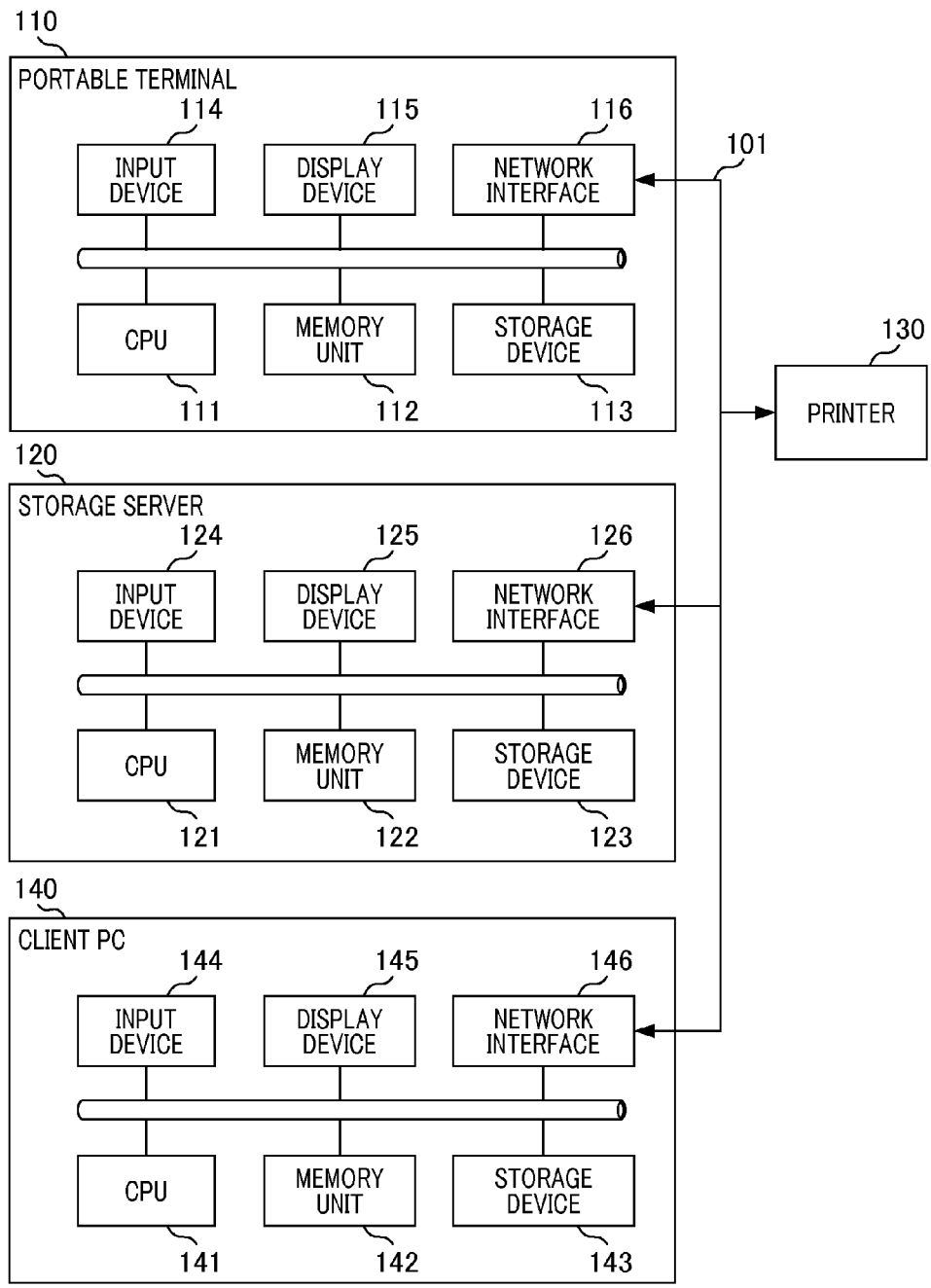
FIG. 1 illustrates an exemplary system configuration of the present embodiment.

FIG. 1 is a diagram illustrating an exemplary system configuration of the present embodiment. The information processing system of the present embodiment is a system that performs conversion of document data including data represented in the reflow format. The reflow format is a format which is capable of providing dynamic layout depending on the screen size of a display device and a display condition such as character size or the like. The information processing system shown in FIG. 1 is constituted by a combination of a portable terminal 110, a storage server 120, a printer 130, a client PC 140, and a network 101 connecting these elements. The network 101 is, for example, LAN, WAN, or the like, where LAN is an abbreviation for Local Area Network and WAN is an abbreviation for Wide Area Network.

The portable terminal 110 includes a CPU 111, a memory unit 112, a storage device 113, an input device 114, a display device 115, and a network interface 116, where CPU is an abbreviation for Central Processing Unit. The CPU 111 controls the entire portable terminal 110. The network interface 116 can connect the portable terminal 110 to the printer 130 or other devices in the system via the network 101. The memory unit 112 is constituted by, for example, a semiconductor random access memory (RAM) and a read only memory (ROM), where RAM is an abbreviation for Random Access Memory and ROM is an abbreviation for Read Only Memory.

The storage device 113 typically includes a hard disk drive or a flash memory and is used for storing an OS, programs and data, where OS is an abbreviation for Operating System.

The portable terminal 110 includes the input device 114 such as a touch panel, a button, or the like and the display device 115 for performing display. The portable terminal 110 uses the components 111 to 116 of the portable terminal 110 that performs communication via an OS and a mutual connection bus 117.

Software for realizing operation processing performed by the portable terminal of the present embodiment is, for example, stored in a computer readable medium including the aforementioned storage device. The software is loaded into a computer from a computer readable medium and is then executed by the CPU 111 of the portable terminal 110. The use of the computer program product by the computer can be operated as a device which is advantageous for document data conversion.

The storage server 120 includes a CPU 121, a memory unit 112, a storage device 123, an input device 124, a display device 125, and a network interface 126. The CPU 121 controls the entire storage server 120. The network interface 126 can connect the storage server 120 to the printer 130 or other devices in the system via the network 101. The memory unit 112 is constituted by, for example, a semiconductor random access memory (RAM) and a read only memory (ROM).

The storage device 123 typically includes a hard disk drive or a flash memory and is used for storing an OS, programs and data. The storage server 120 includes the input device 124 such as a keyboard, a mouse, or the like and the display device 125 for performing display. The storage server 120 uses the components 121 to 126 of the storage server 120 that performs communication via an OS and a mutual connection bus 127.

Software for realizing operation processing performed by the storage server of the present embodiment is, for example, stored in a computer readable medium including the aforementioned storage device. The software is loaded into a computer from a computer readable medium and is then executed by the CPU 121 of the storage server 120. The use of the computer program product by the computer can be operated as a device which is advantageous for document data conversion.

The client PC 140 includes a CPU 141, a memory unit 142, a storage device 143, an input device 144, a display device 145, and a network interface 146. The CPU 141 controls the entire client PC 140. The network interface 146 can connect the client PC 140 to the printer 130 or other devices in the system via the network 101. The memory unit 142 is constituted by, for example, a semiconductor random access memory (RAM) and a read only memory (ROM).

The storage device 143 typically includes a hard disk drive or a flash memory and is used for storing an OS, programs and data. The client PC 140 includes the input device 144 such as a keyboard, a mouse, or the like and the display device 145 for performing display. The client PC 140 uses the components 141 to 146 of the client PC 140 that performs communication via an OS and a mutual connection bus 147.

Software for realizing operation processing performed by the client PC of the present embodiment is, for example, stored in a computer readable medium including the aforementioned storage device. The software is loaded into a computer from a computer readable medium and is then executed by the CPU 141 of the client PC 140. The use of the computer program product by the computer can be operated as a device which is advantageous for document data conversion.

First Embodiment

When a storage server 220 acquires document data, the information processing system according to the first embodiment of the present invention performs data conversion such that display suitable for a portable terminal 210 can be achieved. Note that the hardware configuration of the devices constituting the information processing system of the first embodiment is the same as that of the devices described with reference to FIG. 1.

Figure 2:
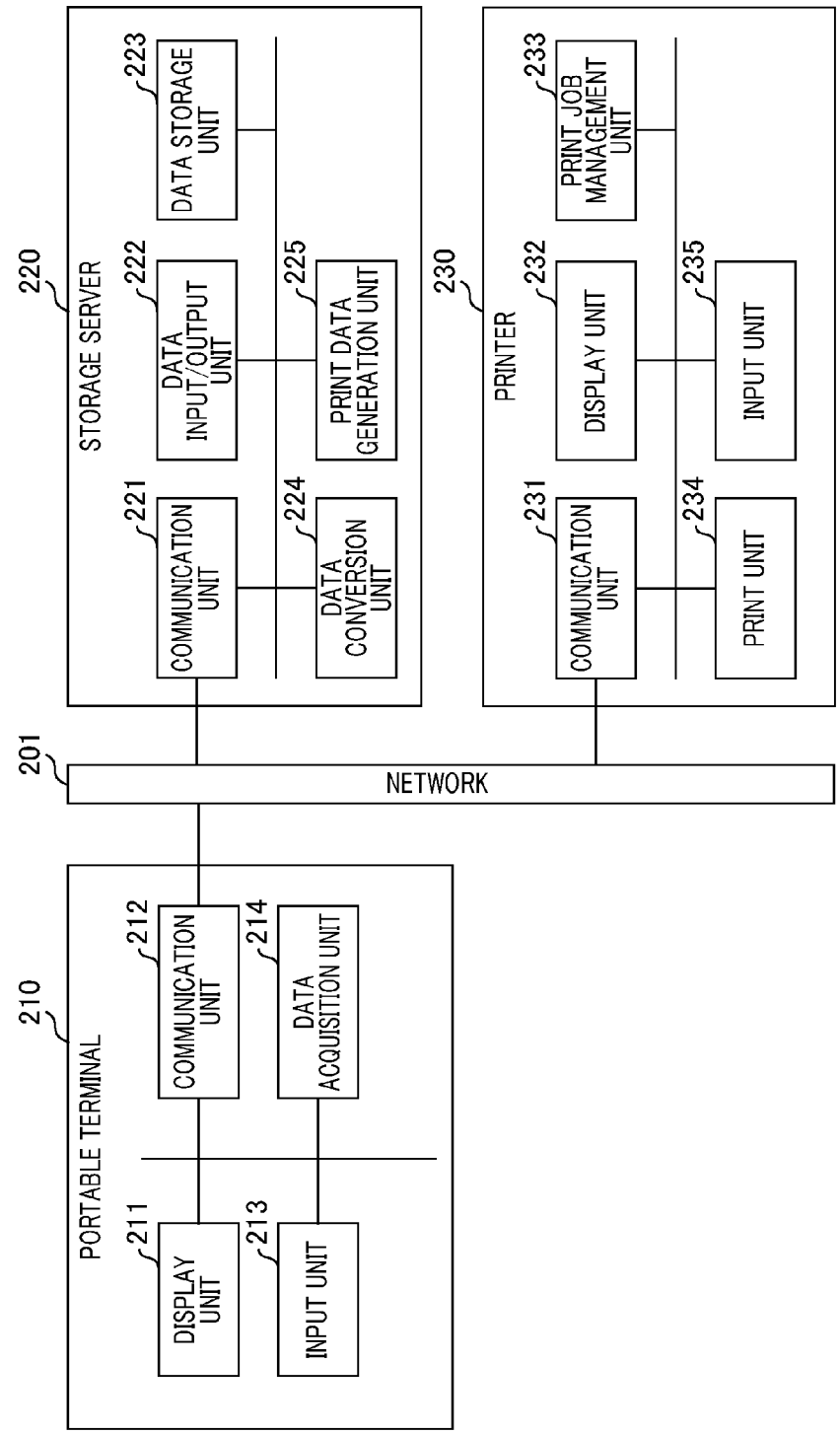
FIG. 2 illustrates a configuration of an information processing system according to a first embodiment.

FIG. 2 is a diagram illustrating a configuration of the information processing system of the first embodiment. In the information processing system shown in FIG. 2, the storage server 220 performs conversion processing for the accumulated document data based on the data retrieval request from document data acquisition software installed in the portable terminal 210. Then, the storage server 220 outputs data subjected to conversion processing to the portable terminal 210. The document data acquisition software is software that acquires any document data from the storage server 120 storing document data to the portable terminal 110. The document data acquisition software is stored in the storage device 113 of the portable terminal 110 and is loaded into the memory unit 112 and executed by the CPU 111.

The information processing system shown in FIG. 2 includes a portable terminal 210 for displaying a document, a storage server 220 for storing document data, and a printer 230. The portable terminal 210, the storage server 220, and the printer 230 communicate with each other via a network 201. The network 201 is, for example Internet, Intranet, or the like.

The portable terminal 210 includes a display unit 211, a communication unit 212, an input unit 213, and a data acquiring unit 214. The display unit 211 performs terminal display. The communication unit 212 is connected to the network 201 so as to perform network communication with other devices. The input unit 213 inputs data and an instruction in accordance with a user operation. The data acquiring unit 214 acquires document data. Document data acquisition software for acquiring document data from the storage server 220 is installed in the data acquiring unit 214.

The storage server 220 includes a communication unit 221, a data input/output unit 222, a data storage unit 223, a data conversion unit 224, and a print data generating unit 225. The communication unit 221 is connected to the network 201 so as to perform network communication with other devices. The data input/output unit 222 inputs document data from an external device or outputs document data to an external device. The data storage unit 223 is a storage unit that stores document data and print data. The document data is data to be converted by the data conversion unit 224. Document data stored in the data storage unit 223 includes document data (reflow type document data) represented in the reflow format. The data conversion unit 224 performs conversion processing for document data stored in the data storage unit 223. The print data generating unit 225 generates print data.

The printer 230 is a print device that performs print processing based on the print request received from the portable terminal 210 or the storage server 220. The printer 230 includes a communication unit 231, a display unit 232, a print job management unit 233, a print unit 234, and an input unit 235. The communication unit 231 is connected to the network 201 so as to perform network communication with other devices. The display unit 232 performs display on the screen provided in the printer 230. The print job management unit 233 manages a print job. The print unit 234 performs print processing for print data. The input unit 235 inputs data and an instruction in accordance with a user operation.

FIGS. 3A and 3B are diagrams illustrating an example of reflow type document data. The range surrounded by a frame 601 in the document data shown in FIG. 3A indicates the entire document. The range surrounded by a frame 604 describes a chapter. The range surrounded by a frame 602 describes a text object. In a reflow type document, a text is basically described by a character string without a line break code except for an intentional one. The range surrounded by a frame 603 describes a graphic object, the range surrounded by a frame 605 describes a table object, and the range surrounded by a frame 606 describes an image object.

In EPUB, these objects are described in the XHTML format. For example, a chapter in the range surrounded by the frame 604 is described like "<h1>chapter 2</h1>". A character string in the range surrounded by the frame 602 is described like "<p>abcdefghij . . . </p>". A graphic object in the range surrounded by the frame 603 is described like "<svg> . . . </svg>" using the SVG format. A table object in the range surrounded by the frame 605 is described like "<table border=1><caption>Table 1</caption><tr> . . . </tr></table>".

An image object in the range surrounded by the frame 606 is described like "<img src="xxx.jpg"alt="xxx"/>". Other reflow type documents are described in a format defined in the HTML format or the Microsoft word format. When the layout in the reflow type document data is suitable to be strictly designated, a reflow type description may be problematic. A fixed layout type description to be described below with reference to FIG. 3B may also be used for such a portion.

Figures 4A, 4B:
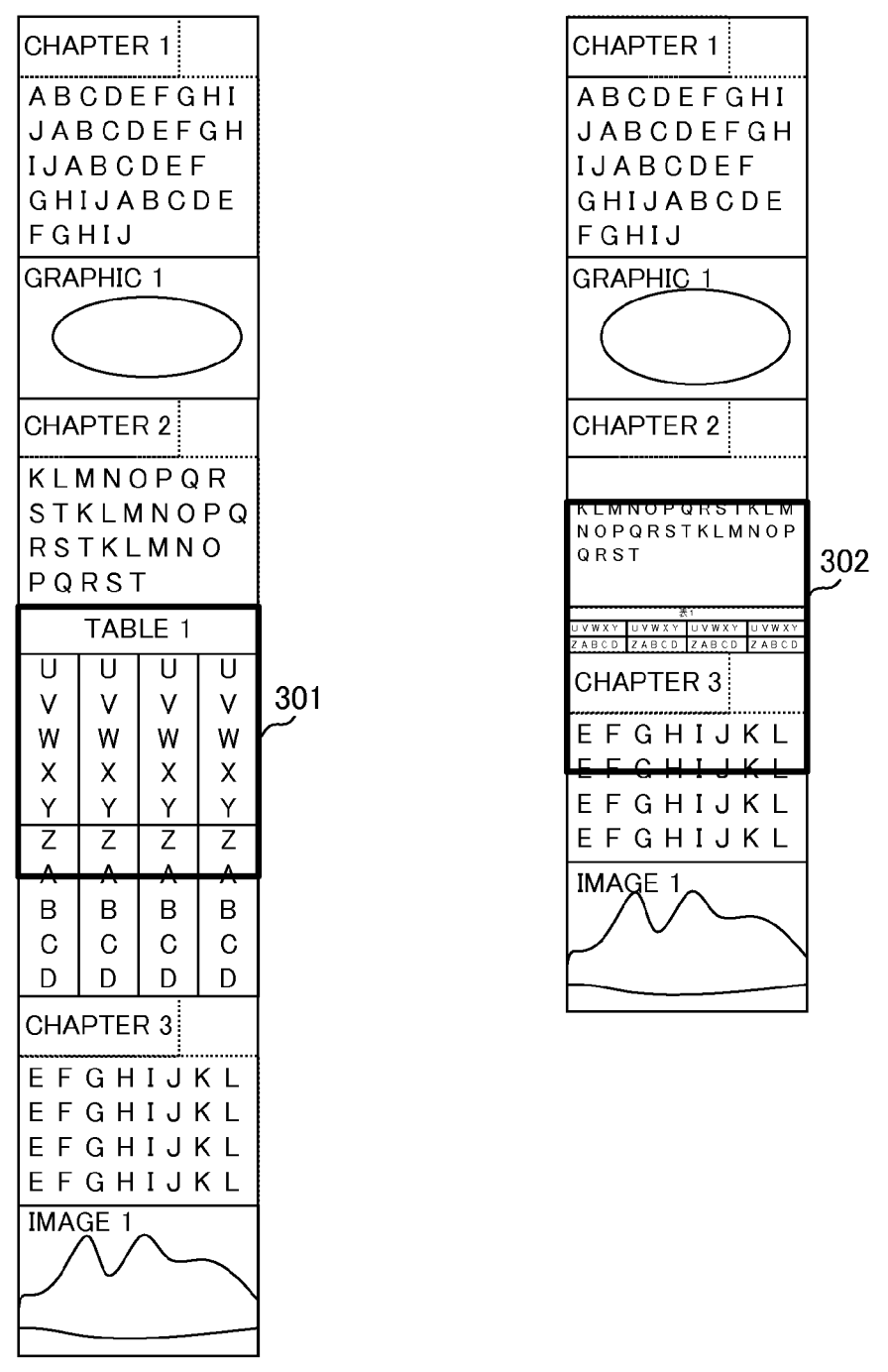

FIGS. 4A and 4B are diagrams illustrating screen display when the reflow type document data shown in FIG. 3A is displayed on a portable terminal. Each of the range surrounded by a frame 301 and the range surrounded by a frame 302 indicates the screen on the portable terminal 210. In this example, the vertical screen is scrolled in a vertical direction so that the entire document can be seen. Note that the screen on the portable terminal 210 may also be a horizontal screen instead of a vertical screen and scrolling may also be performed in a horizontal direction.

FIG. 4A illustrates screen display when the entire object does not fit within a screen frame in the range surrounded by the frame 301, where the width of a table object "Table 1" is adapted to the screen width such that the table object "Table 1" is displayed as an elongate table. Here, when the width of the table object is greater than the screen width, the portable terminal 210 intends to narrow the width of each column and increase the width of each row in the table object such that the width of the table object fits within the screen width. However, in this case, even when the width of the table object fits within the screen width, the height of the table object does not fit within the screen height, resulting in protrusion from the screen.

FIG. 4B illustrates an example in which the entire table object "Table 1" is zoomed out to match the screen width and thus the entire table object is displayed on the screen frame in the range surrounded by the frame 302. Here, the size of the entire table object is reduced with reduction in character size, so that the entire table object can be displayed as a list within a screen. However, in this example, the content of the table object cannot be read because the character size is too small. In other words, if the character size of the table object is prioritized, the size of the entire table object increases, and thus, cannot be displayed as a list. Thus, if an attempt is made to display the entire table object as a list, the content of the table object cannot be read because the character size is too small.

FIGS. 5A to 5D are exemplary illustrations of document data according to the present embodiment. The range surrounded by a frame 401 indicates the screen on the portable terminal. Table 1 is zoomed out and the character "see printing 1" which is information (reference information) indicating printout and a reference destination of a printed matter is displayed on the zoomed-out Table 1. Reference is made to a printed matter corresponding to "printing 1" in accordance with the above reference information, so that the printed matter on which the content of the zoomed-out Table 1 has been printed can be specified.

Figures 5A, 5B, 5C, 5D:
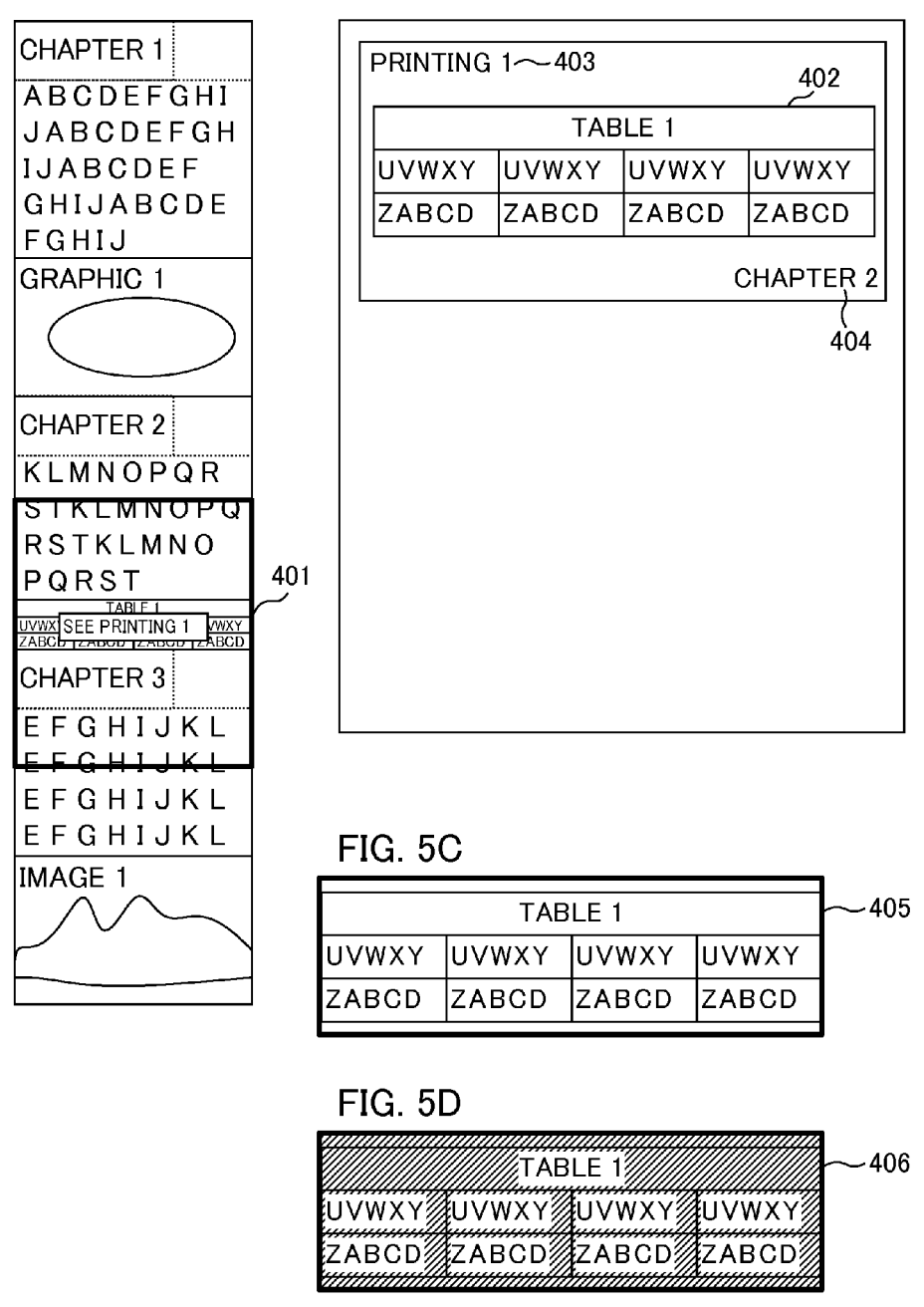

FIG. 5B is a diagram illustrating an exemplary printed matter to be printed according to the present embodiment. In the present embodiment, the storage server 220 generates print data (output data) corresponding to a portion which may be difficult to be read as a list displayed on the portable terminal 210, and then the printer 230 outputs the generated print data. In the printed matter subjected to printing, Table 402 is displayed as a list with a readable character size, and a "printing 1" 403 is added to the printed matter as a reference destination from the range surrounded by the frame 401 shown in FIG. 5A. Thus, the storage server 220 generates print data added with the reference destination from the range surrounded by the frame 401 shown in FIG. 5A.

When there is a plurality of print targets, the storage server 220 can distinguish from each other by adding a sequence number with a print target created as a reference destination. In the printed matter shown in FIG. 5B, information 404 indicating that which chapter on the portable terminal display corresponds to the printed Table 402 is added. Thus, the storage server 220 generates print data added with the information 404.

FIGS. 5C and 5D are exemplary illustrations of document data according to the variant example of the present embodiment. In this example, the portable terminal 210 displays a printed portion (in this example, Table 1) in a simple fashion. More specifically, the portable terminal 210 reduces a printed portion and further highlights the printed portion with a frame. For example, the portable terminal 210 highlights Table 1 with a frame of a thick line or a colored line as shown in FIG. 5C or highlights the entire Table 1 by hatching as shown in FIG. 5D. Of course, a method for highlighting a printed portion is not limited to the aforementioned one.

Figure 6B:
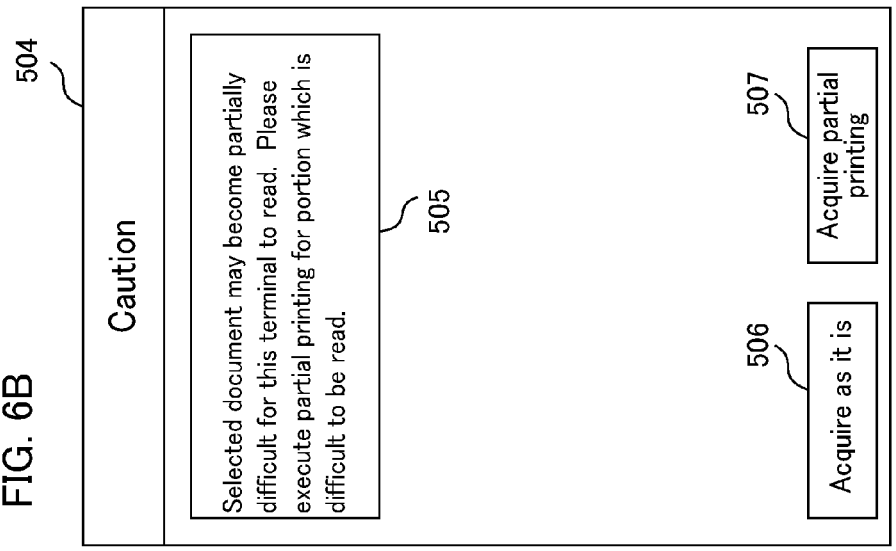
Figure 6A:
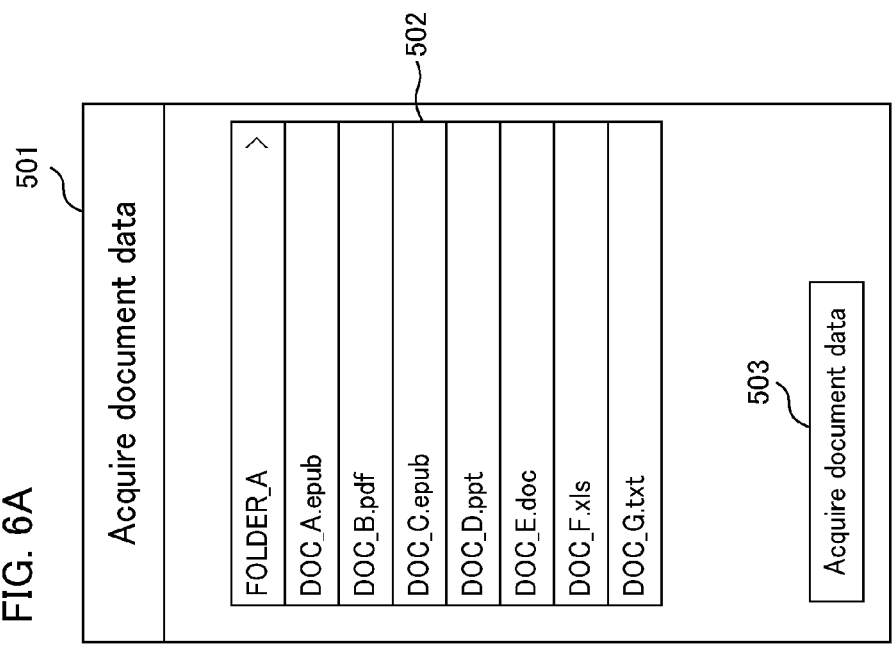

FIGS. 6A to 6D are diagrams illustrating screens to be displayed on an input device of a portable terminal upon execution of document data acquisition software. FIG. 6A shows a screen (document data acquisition screen) for designating document data to be acquired.

A document data acquisition screen 501 has a document data list 502 and a document data acquiring button 503. The document data list 502 is document data stored in the storage server 220. Through the processing in S701 shown in FIG. 7 to be described below, the document data is displayed on the document data list 502. A user selects document data desired to be displayed from among document data displayed on the document data list 502, and then depresses the document data acquiring button 503. The document data acquisition software acquires the selected document data from the storage server 220 using the depression as a trigger.

FIG. 6B shows a screen (caution display screen) to be displayed by document data acquisition software when target document may be difficult to be read on the portable terminal display after the document data acquiring button is depressed.

A caution display screen 504 has a caution message display field 505, a directly acquiring button 506, and a partial printing acquiring button 507. A caution prompted to a user is displayed on the caution message display field 505. In this example, a sentence for reporting the fact that target document may be difficult to be read on the portable terminal display, and thus, a portion which may be difficult to be read can be subject to partial printing is displayed on the caution message display field 505.

The directly acquiring button 506 is a button which is used for designating direct acquisition of document data. The partial printing acquiring button 507 is a button which is used for designating partial printing when a portion which may be difficult to be read is printed. Note that partial printing is to print a part of an object from among a plurality of objects constituting document data. When a user depresses the partial printing acquiring button 507, a partial print setting screen 508 shown in FIG. 6C is displayed.

FIG. 6C is a diagram illustrating a partial print setting screen. The partial print setting screen 508 is a screen which is used for setting partial printing. The partial print setting screen 508 has the following setting fields in which information is set by a user.

A minimum allowable character size setting field 509 is a field for setting a minimum allowable character size used for the portable terminal display. The minimum allowable character size is the minimum character size which may be used when a character is displayed on a portable terminal. A user designates the minimum allowable character size in advance. A user typically designates the minimum character size which is readable thereby.

A maximum allowable demagnification ratio setting field 510 is a field for setting a maximum allowable demagnification ratio when a graphic or an image is zoomed out on the portable terminal display. The maximum allowable demagnification ratio is the maximum demagnification ratio which may be used when a graphic or an image is displayed on a portable terminal. A user designates the maximum allowable demagnification ratio in advance. For example, when the maximum allowable demagnification ratio is 40%, an original graphic or an original image is permitted to be reduced by 40%.

An object setting field 511 is a field for setting which type of an object (e.g., table, graphics, image) is to be determined as a target object type to be displayed on a single screen, in other words, is to be determined as a target for partial printing. An output destination printer setting field 512 is a field for setting an output destination printer. Information (address or the like) used for specifying a printer set in the output destination printer setting field 512 is referred to as "output printer information". The printing sheet size setting field 513 is a field for setting a sheet size used for printing.

A printing text character size setting field 514 is a field for setting a character size of a text upon printing. A print setting field 515 is a field for setting whether or not an object to be printed is printed so as to match a sheet size.

An integrated print setting field 516 is a field for setting integrated print setting. The integrated print setting is a setting for printing a plurality of objects on the same page. A front and rear print setting field 517 is a field for setting whether or not printing is made by including the front and rear portions of an object to be printed. When printing is set by including the front and rear portions of an object to be printed and the front and rear objects are text objects, a character string of a predetermined number of rows (e.g., 3 rows) is extracted and the extracted character string is added to the object to be printed. When the front and rear objects are objects other than text objects, the worth of one object is extracted and the extracted object is added to the object to be printed.

A simple display setting field 518 is a field for setting whether or not a printed location is displayed in a simple fashion. An example of simple display is shown in FIGS. 5C and 5D. A reference destination display setting field 519 is a field for setting whether or not reference destination is displayed on each of the printed matter and the terminal display.

A preview check box 520 is a field for designating whether or not a preview display is made prior to printing. A partial printing executing button 521 is a button for providing an instruction for executing partial printing.

FIG. 6D is a diagram illustrating an exemplary preview selection screen. A preview selection screen 522 is displayed when the partial printing executing button 521 is depressed with a preview display designated on the preview check box 520.

A field 523 is a preview area on which an object to be printed is displayed as a preview. A field 524 displays information indicating the sequence number of the object to be printed which is displayed as a preview. A field 525 is an operation field for switching an object to be printed. A print selection check box 526 is a check box for selecting an object to be printed which is displayed as a preview on the field 523. A field 527 indicates the number of objects to be printed selected for printout. A partial printing executing button 528 is a button for executing partial printing for the selected objects to be printed. When the partial printing executing button 528 is depressed, the process in S716 shown in FIG. 8 to be described below is executed.

Next, a description will be given of examples of a method for determining an object, a method for determining a chapter, and a method for determining a fixed layout by analyzing the structure and data of reflow type document data.

The aforementioned document data shown in FIG. 3A is an example of document data in the EPUB format, and is further used for determining an object and a chapter. The range surrounded by the frame 603 is used for determining a graphic object. The object surrounded between "<svg>" and "</svg>" is determined as a graphic object. The range surrounded by the frame 604 is used for determining a chapter. The portion surrounded between "<hx>" and "</hx>" is determined as a chapter. A numerical value is designated in "x".

The range surrounded by the frame 605 is used for determining a table. The portion surrounded between "<table>" and "</table>" is determined as a table. In the range surrounded by the frame 606, the portion "<img . . . />" used for determining an image is determined as an image.

FIG. 3B is a diagram illustrating a fixed layout determination method. The range surrounded by the frame 607 is used for determining a fixed layout. Unlike the layout in the reflow type document data, in the fixed layout, the display position of an object is determined by data in advance. For determining a fixed layout, "rendition: layout-pre-paginated" is searched in accordance with a data structure, and an object(s) subsequent to the searched "rendition: layout-pre-paginated" is recognized as a fixed layout. The completion of a fixed layout is made by detecting "rendition: layout-reflowable", and an object(s) included until "rendition: layout-reflowable" is detected is treated as a fixed layout. When a fixed layout is locally designated, only the local portion is determined as a fixed layout. While, in the present embodiment, a description has been given by taking an example of EPUB format, object detection processing may also be performed for the document data described in the HTML format or the word format in accordance with the respective definitions.

Figure 7:
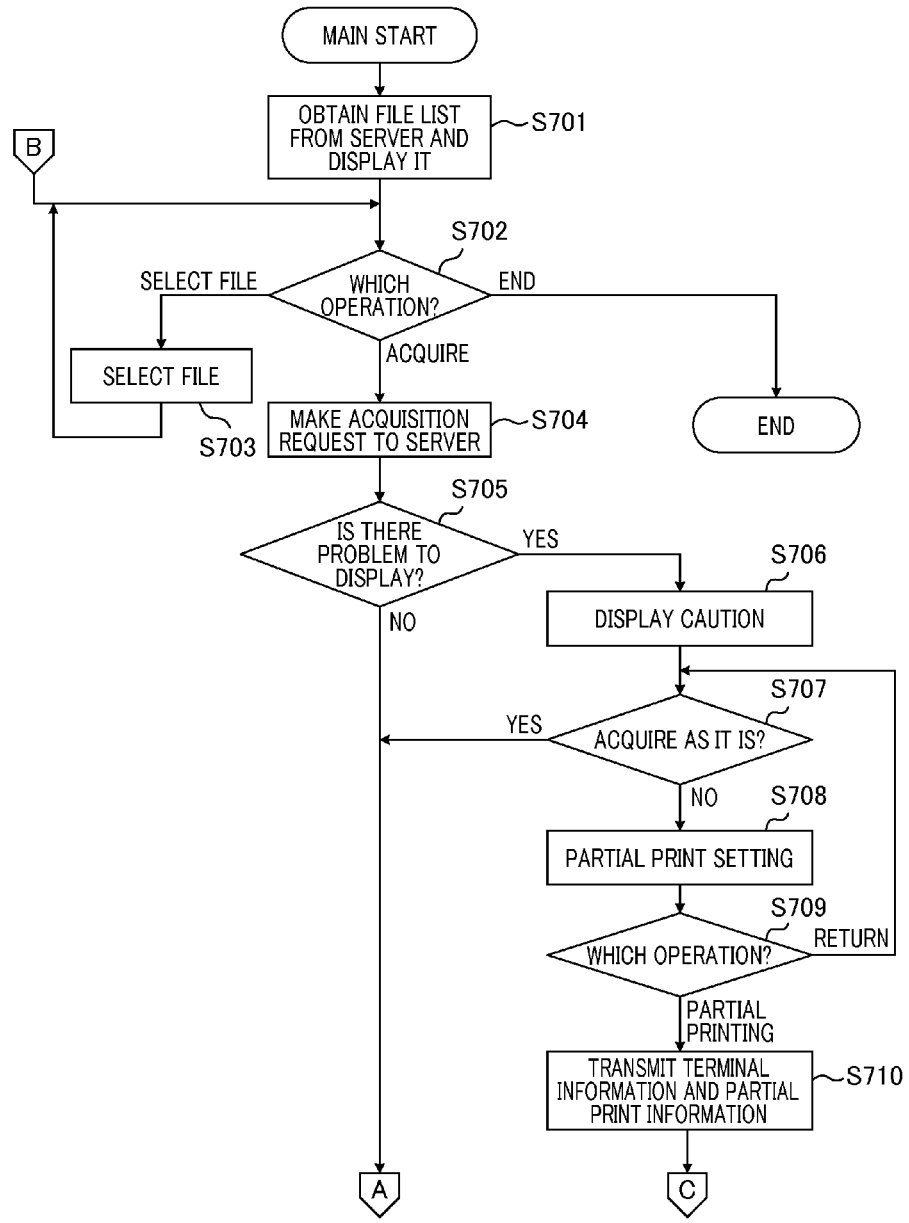
FIG. 7 is a flowchart illustrating document data acquisition processing.
Figure 8:
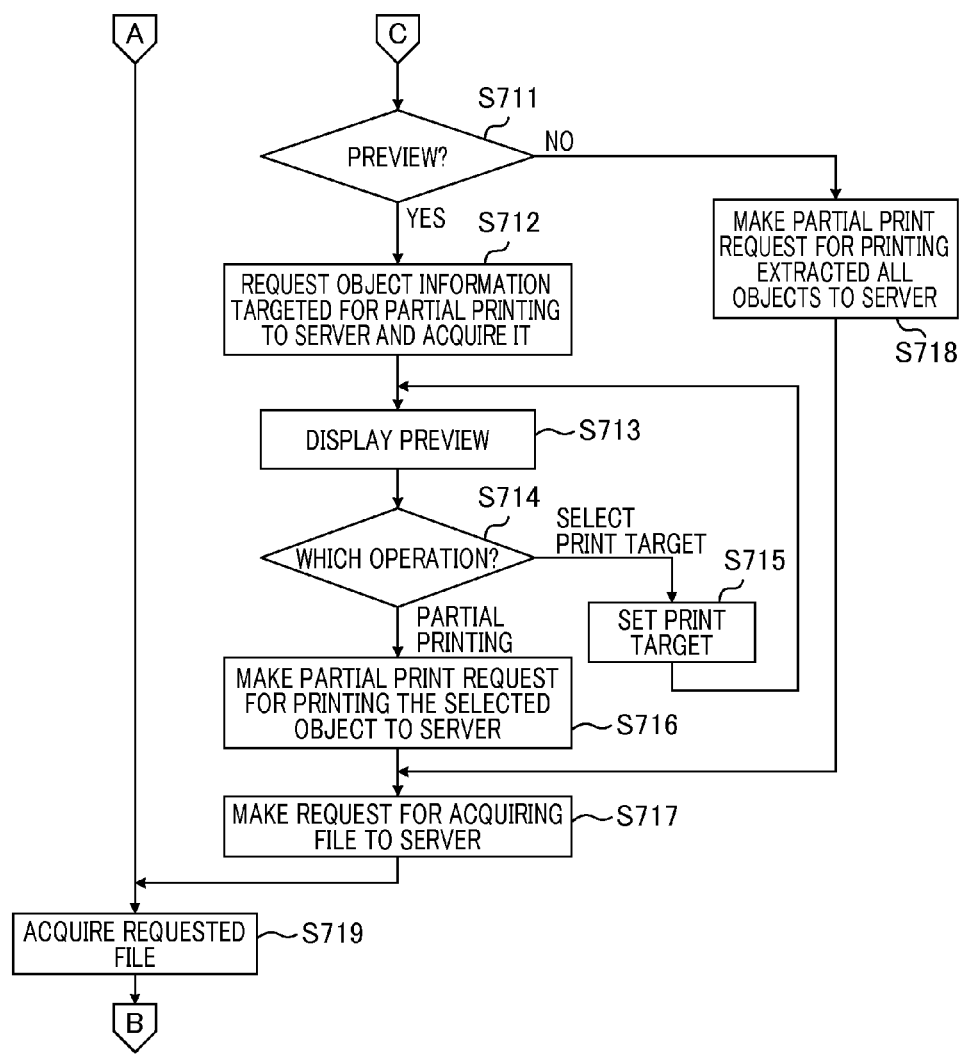
FIG. 8 is a flowchart illustrating document data acquisition processing.

FIG. 7 and FIG. 8 are flowcharts illustrating document data acquisition processing according to the present embodiment. In the present embodiment, the document data acquisition software installed in the portable terminal 210 acquires document data from the storage server 220.

The document data acquisition software stored in the storage device 113 is loaded into the memory unit 112 and is executed by the CPU 111. In this manner, the CPU 111 controls the memory unit 112, the storage device 113, the input device 114, the display device 115, and the network interface 116 to thereby perform the processing of the flowchart shown in FIG. 7 and FIG. 8.

Firstly, in S701 shown in FIG. 7, the CPU obtains a document data list registered on the storage server 220 from the storage server 220, and then displays the document data list on the display unit 211. More specifically, the CPU displays the document data acquisition screen shown in FIG. 6A. Next, in S702, the CPU determines a user input operation via the input unit 213. If the user input operation is a file selecting operation, the CPU stores the file name selected in S703, and the process returns to S702.

If it is determined in S702 that the user input operation is a document data acquiring operation, the CPU makes a request for acquiring document data having the selected file name to the storage server 220 in S704. The acquiring request is processed as a file acquiring request which is processed in S801 to be described below with reference to FIG. 9. Next, in S705, the CPU receives a reply indicating whether or not there is a possibility to be problematic for displaying the document data requested from the storage server 220 on a portable terminal, and then performs determination based on the reply. Here, the reply received by the CPU is a reply in S805 or S807 to be described below with reference to FIG. 9. If it is determined that there is no possibility to be problematic, the process advances to S719 shown in FIG. 8, whereas if there is a possibility to be problematic, the CPU displays the caution described with reference to FIG. 6B in S706.

Next, in S707, the CPU determines whether the input designation by the user is either designation for directly acquiring document data or designation for acquiring document data by partial printing via the input unit 213. Here, a determination is made by the fact that either the directly acquiring button 506 or the partial printing acquiring button 507 in the screen shown in FIG. 6B has been depressed. If it is determined that the input designation is designation for directly acquiring document data, the process advances to S719. At this time, the CPU makes a file acquiring request to the storage server 220, so that the response for the file acquiring request is determined as a file acquiring response by response determination in S808 shown in FIG. 9 to be described below.

On the other hand, if it is determined in S707 that the input designation is designation for acquiring document data by partial printing, the CPU executes the following processing in S708. The CPU displays the setting screen for setting conditions for partial printing described with reference to FIG. 6C, and acquires the setting values (setting information) instructed by the user to thereby set various conditions. At this time, the CPU makes a partial print request to the storage server 220. In this manner, the response for the partial print request is determined as a partial printing response by response determination in S808 shown in FIG. 9 to be described below.

Next, in S709, the CPU determines a user input operation. If the input operation is an operation for returning an input, the process returns to S707. If the input operation is a partial printing execution designation, the process advances to S710.

In S710, the CPU transmits the display width and the display height of the portable terminal and the setting information for setting partial printing described with reference to FIG. 6C to the storage server 220. Next, in S711 shown in FIG. 8, the CPU determines whether or not a preview instruction has been made by a user. The result of determination is transmitted to the storage server 220 and is used for the determination processing in S816 shown in FIG. 10. If it is determined that no preview instruction has been made by a user, the process advances to S718. When a preview instruction has been made by a user, the process advances to S712. In S712, the CPU requests object information targeted for partial printing to the storage server 220 and then receives a reply in S817 shown in FIG. 10 to be described below to thereby acquire the object information targeted for partial printing. Note that object information targeted for partial printing is information which is used for displaying an object targeted for partial printing as a preview.

Next, in S713, the CPU displays an object to be printed indicated by the acquired object information targeted for partial printing on the preview area 523 described with reference to FIG. 6D. Next, in S714, the CPU determines a user operation on a preview selection screen. If the determined operation is print target object selection, the process advances to S715. The CPU sets an object selected as an object to be actually printed by a user from among objects to be printed, and the process returns to S713.

On the other hand, if it is determined by the CPU in S714 that the partial printing executing button 528 has been depressed, the process advances to S716. In S716, the CPU makes a partial print request for printing the selected object targeted for partial printing as the object targeted for partial printing to the storage server 220. The storage server 220 receives the partial print request in S818 shown in FIG. 10.

Next, in S717, the CPU makes a request for acquiring document data changed by partial print data generation processing to the storage server 220, and the process advances to S719. In S719, the CPU acquires the document data requested to the storage server 220 upon receipt of the reply in S821 shown in FIG. 10 to be described below, the process returns to S702 shown in FIG. 7. On the other hand, in S718, the CPU makes a partial print request for printing the extracted all objects as objects targeted for partial printing to the storage server 220. The storage server 220 receives the partial print request in S818 shown in FIG. 10. On the other hand, if it is determined in S702 that the input designation is an ending operation, the processing performed by document data acquisition software ends. In the present embodiment, the aforementioned processing is processing for acquiring document data from the storage server 220 to the portable terminal 210.

Figure 9:
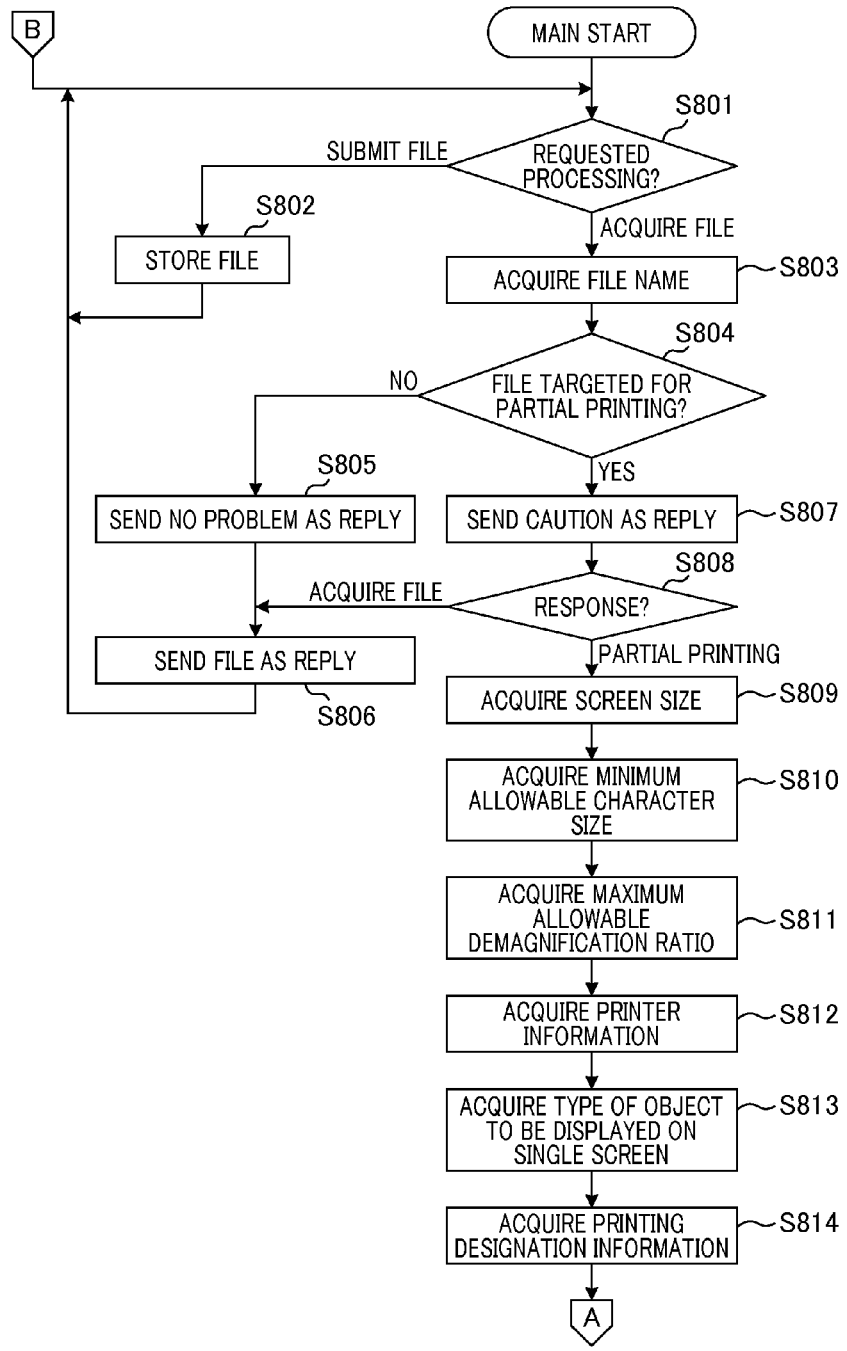
FIG. 9 is a flowchart illustrating an example of operation processing performed by a storage server.
Figure 10:
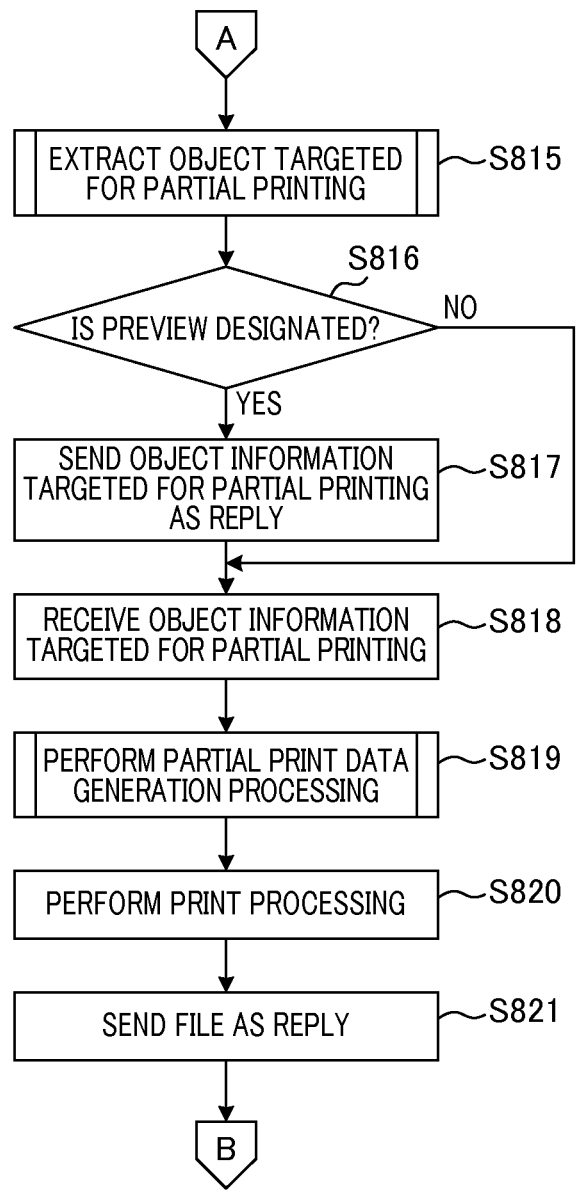
FIG. 10 is a flowchart illustrating an example of operation processing performed by a storage server.

FIG. 9 and FIG. 10 are flowcharts illustrating an example of operation processing performed by a storage server. The operation processing is processing depending on various types of requests from the portable terminal 210 and is operated in synchronization with the operation processing performed by the portable terminal 210 described with reference to FIG. 7 and FIG. 8.

The processing program stored in the storage device 123 is loaded into the memory unit 122 and is executed by the CPU 121. In this manner, the CPU 121 controls the memory unit 122, the storage device 123, the input device 124, the display device 125, and the network interface 126 to thereby perform the processing of the flowchart shown in FIG. 9 and FIG. 10.

In S801 shown in FIG. 9, the CPU determines the request from the exterior. An example of the request from the exterior includes a request from the portable terminal 110 or a request from the client PC 140. If it is determined that the request is a file submitting request from the client PC 140, the process advances to S802.

In S802, the CPU receives document file data via the data input/output unit 222 and stores the document file data in the data storage unit 223 to thereby register document data, and the process returns to S801. Although not illustrated in the flowchart shown in FIG. 9 and FIG. 10, processing for transmitting a document data list registered on the storage server to the portable terminal 210 is executed in response to a request from the portable terminal 210.

On the other hand, if it is determined in S801 that the request is a file acquiring request, the process advances to S803. In S803, the CPU acquires a document file name from a request source. In the present embodiment, the request source is the portable terminal 210 that has executed the processing in S704 shown in FIG. 7.

Next, in S804, the CPU determines whether or not the requested document file is a file targeted for partial printing. The CPU determines whether or not the requested document file is a file targeted for partial printing using a file extension. In the present embodiment, when the file is a file with an EPUB extension, i.e., an EPUB file, the CPU determines that the requested document file is a file targeted for partial printing. The CPU may also determine that the requested document file is reflow type document data by examining the configuration of the file. In this case, if the requested document file is reflow type document data, in which the layout and the size of the object change adaptively in response to the screen size of the device, such as an EPUB file or the like, the CPU determines that the requested document file is a file targeted for partial printing. If it is determined by the CPU in S804 that the requested document file is not a file targeted for partial printing, the process advances to S805.

In S805, the CPU transmits information indicating that there is no problem for displaying document data on the portable terminal 210 back to the request source via the data input/output unit 222. The portable terminal 210 serving as the request source processes reply data in S705 shown in FIG. 7.

Next, in S806, the CPU extracts the requested document file from the data storage unit 223 and then transmits the requested document file back to the request source via the data input/output unit 222. Then, the process returns to S801. The portable terminal 210 serving as the request source processes reply data in S717.

On the other hand, if it is determined in S804 that the requested document file is a file targeted for partial printing, the process advances to S807. In S807, the CPU transmits information indicating that there is a problem for displaying document data on the portable terminal 210 back to the request source via the data input/output unit 222. The portable terminal 210 serving as the request source processes reply data in S705 shown in FIG. 7.

Next, in S808, the CPU determines a response from the request source of the reply in S807. If the response is a file acquiring request, the process advances to S806. If the response is a partial print request, the process advances to S809. At this time, the portable terminal 210 serving as the request source makes a response in accordance with the determination result in S707 shown in FIG. 7.

Next, the CPU receives information transmitted in S710 shown in FIG. 7. The information is the display width and the display height of the portable terminal and setting information for setting partial printing. In other words, in S809, the CPU functions as a size acquiring unit that acquires the screen size of the portable terminal 210 serving as the request source, i.e., the display device for displaying document data. Note that information to be acquired may be information (e.g., the name or the like of the display device) which is used for specifying the screen size of the display device. Next, in S810, the CPU acquires minimum allowable character size information which is used for providing a display on the portable terminal.

Next, in S811, the CPU acquires maximum allowable demagnification ratio information which is used for displaying an image on the portable terminal from partial printing setting information. In other words, the CPU functions as a condition acquiring unit that acquires the display condition of document data. Next, in S812, the CPU acquires output printer information upon partial printing from partial printing setting information. Next, in S813, the CPU acquires designation information for designating a target object to be displayed on a single screen on the portable terminal from partial printing setting information. The target object is one or a plurality of combinations of a table object, a graphic object, an image object, and a fixed layout object.

Next, in S814, the CPU acquires partial printing designation information from partial printing setting information. Partial printing designation information includes a sheet size, a text character size upon printing, and a designation as to whether or not an object to be printed is printed in conformity to a sheet size. Partial printing designation information also includes a designation for integrally printing a plurality of objects to be printed on one page and a designation as to whether or not printing is made by including the front and rear portions of an object to be printed. Partial printing designation information further includes a designation as to whether or not a printed location is displayed in a simple fashion and a designation as to whether or not reference destination is displayed on each of the printed matter and the terminal display.

Next, in S815 shown in FIG. 10, the CPU performs extraction processing for extracting an object targeted for partial printing to be described below with reference to FIG. 11. In the present embodiment, the data conversion unit 224 of the storage server 220 executes extraction processing for extracting an object targeted for partial printing.

Next, in S816, the CPU receives the determination result as to whether or not there is the preview instruction in S711 shown in FIG. 8 on the portable terminal 210 serving as the request source. The CPU determines whether or not there is a preview request for displaying an object targeted for partial printing as a preview based on the received determination result. The preview request is a preview instruction designated by the user of the portable terminal 210.

If there is no preview request for displaying an object targeted for partial printing as a preview, the process advances to S818. If there is a preview request for displaying an object targeted for partial printing as a preview, the process advances to S817.

In S817, the CPU transmits object information targeted for partial printing back to the portable terminal 210 serving as the request source. The portable terminal 210 serving as the request source acquires the reply in S712 shown in FIG. 8. Next, in S818, the CPU acquires a print request for printing an object targeted for partial printing from the portable terminal 210 serving as the request source. The print request includes information for indicating which object targeted for partial printing is requested for printing. Note that the portable terminal 210 serving as the request source makes a request in S716 or S718 shown in FIG. 8.

Next, in S819, the CPU performs partial print data generation processing to be described below with reference to FIG. 15 and FIG. 16. Then, in S820, the CPU transmits the generated print data to a printer specified by output printer information to thereby perform print processing.

Next, in S821, the CPU transmits the document file changed by partial print data generation processing to be described below back to the request source via the data input/output unit 222, and the process returns to S801 shown in FIG. 9. The aforementioned operation processing performed by the storage server 220 of the present embodiment is processing depending on various types of requests from the portable terminal 210.

Figure 11:
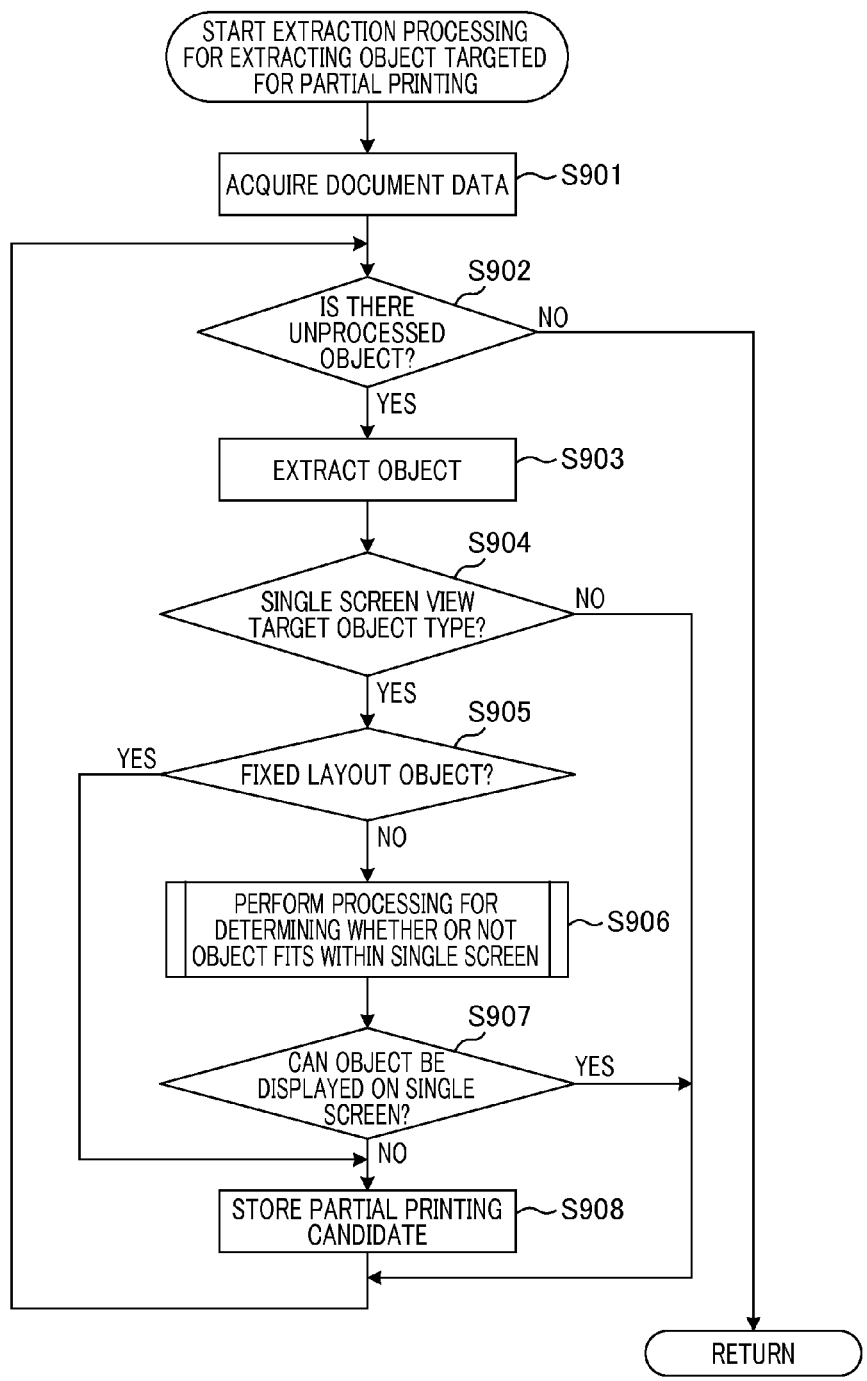
FIG. 11 is a flowchart illustrating extraction processing for extracting an object targeted for partial printing.

FIG. 11 is a flowchart illustrating extraction processing for extracting an object targeted for partial printing according to the present embodiment. The processing shown by the flowchart is called from S815 shown in FIG. 10.

The processing program stored in the storage device 123 is loaded into the memory unit 122 and is executed by the CPU 121. In this manner, the CPU 121 controls the memory unit 122, the storage device 123, the input device 124, the display device 125, and the network interface 126 to thereby perform the processing of the flowchart shown in FIG. 11.

In S901, the CPU acquires document data from which an object targeted for partial printing is extracted from the data storage unit 123 based on the file name acquired in S803 shown in FIG. 9. Next, in S902 and subsequent processes, the CPU analyzes all data in the document data in sequence and then determines the type of object in all the data to thereby perform processing in sequence. The types of an object include a character object, a graphic object, an image object, and a fixed layout object.

Firstly, in S902, the CPU determines whether or not there is an unprocessed object. If there is no unprocessed object, the process returns to the caller. If there is an unprocessed object, the process advances to S903, and the CPU extracts an object. The CPU determines the object using the method described with reference to FIGS. 3A and 3B and extracts a corresponding portion of data to thereby extract an object.

Next, in S904, the CPU determines whether or not the extracted object is a single screen display target object type. The single screen display target object type is the type of an object to be displayed on a single screen. In other words, the CPU functions as a specifying unit that specifies an object, which is designated as a target to be displayed on a single screen of the portable terminal, from document data. The CPU determines whether or not the type of the extracted object is a single screen display target object type based on the content designated in the object setting field 511 shown in FIG. 6C. In other words, if the type of the object is an object type set by the object setting field 511, the CPU determines that the type of the object is a single screen display target object type. If the type of the object is not a single screen display target object type, the process returns to S902. If the type of the object is a single screen display target object type, the process advances to S905.

In S905, the CPU determines whether or not the extracted object is a fixed layout object. If the CPU determines that the object is a fixed layout object, the process advances to S908. If the CPU determines that the object is not a fixed layout object, the process advances to S906.

In S906, the CPU executes single screen fitting determination processing to be described below with reference to FIGS. 12 to 14. The single screen fitting determination processing is processing for determining whether or not an object fits within a single screen.

Next, in S907, the CPU determines whether or not the object can be displayed on a single screen in response to the result of single screen fitting determination processing in S906. If the object can be displayed on a single screen, the process returns to S902. If the object cannot be displayed on a single screen, the process advances to S908.

Next, in S908, the CPU stores the object which cannot be displayed on a single screen as a partial printing candidate object in the data storage unit 223. In other words, the CPU functions as an extracting unit that executes the following processing. The CPU extracts an object which cannot be displayed at least on a single screen as an object to be output which is listing-output (listing-printed) by the printer 230 from among the objects of the single screen display target object type based on the screen size and the display condition of the portable terminal. Then, the process returns to S902.

Figure 12:
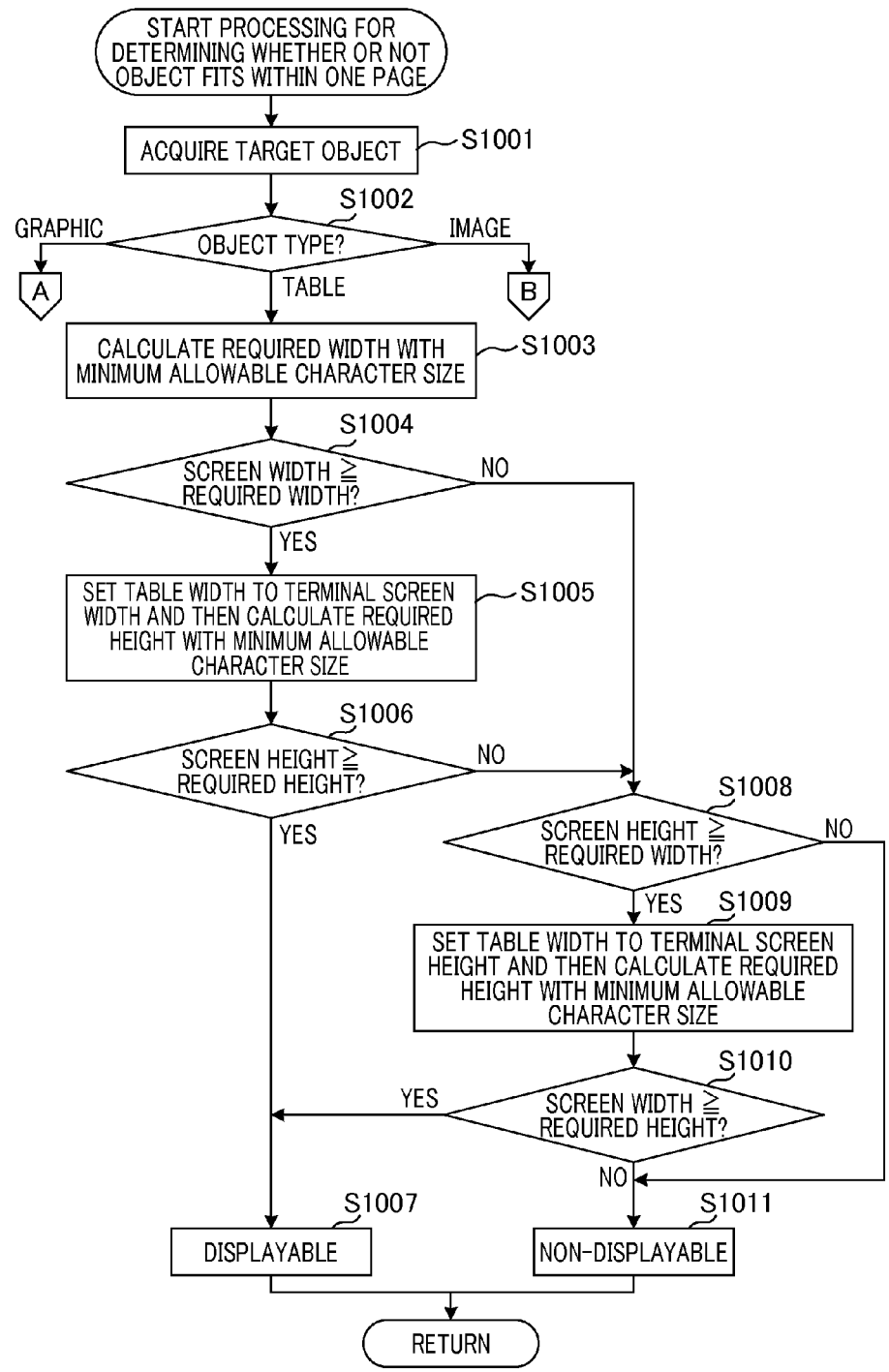
FIG. 12 is a flowchart illustrating single screen fitting determination processing.
Figure 13:
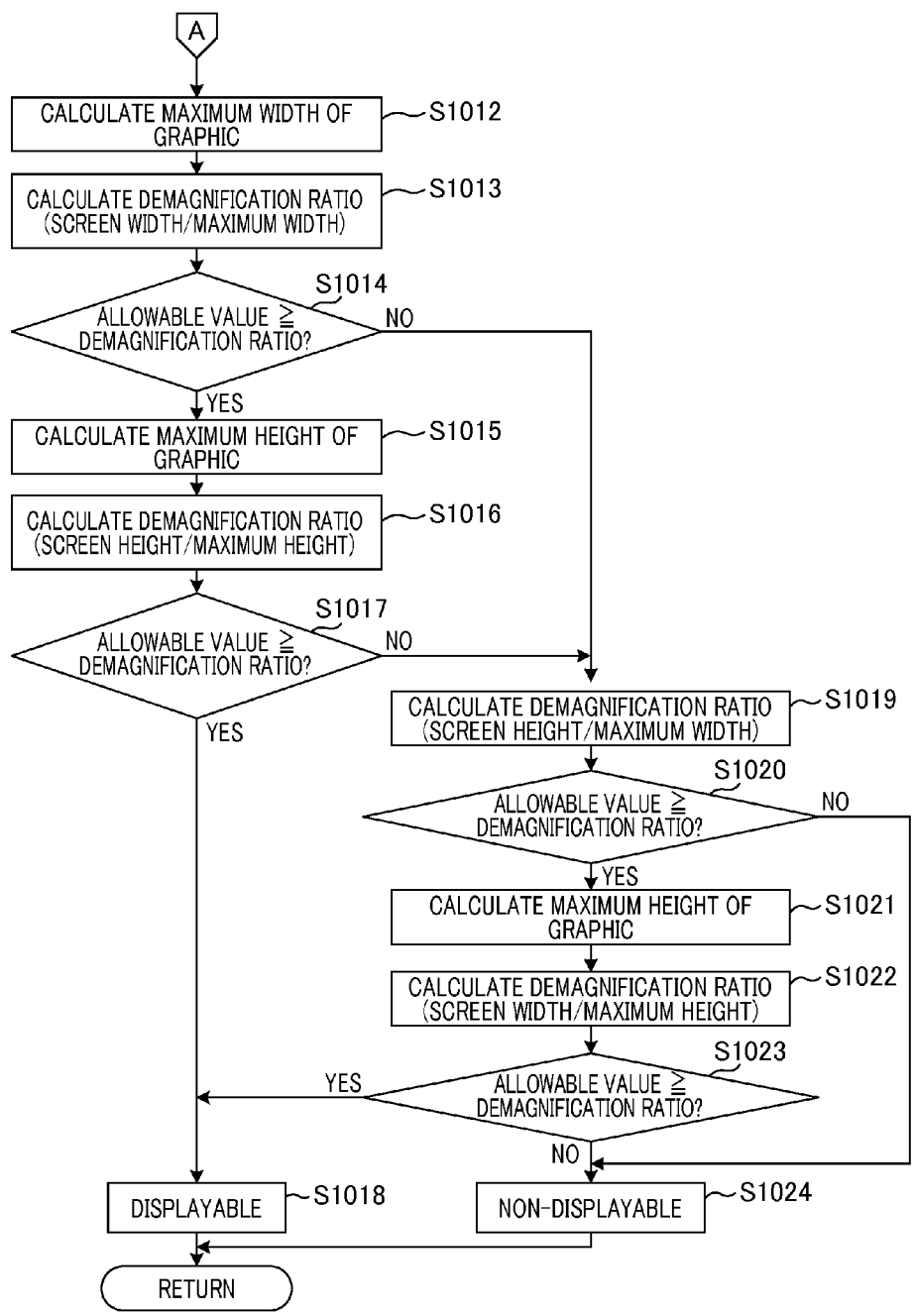
FIG. 13 is a flowchart illustrating single screen fitting determination processing.
Figure 14:
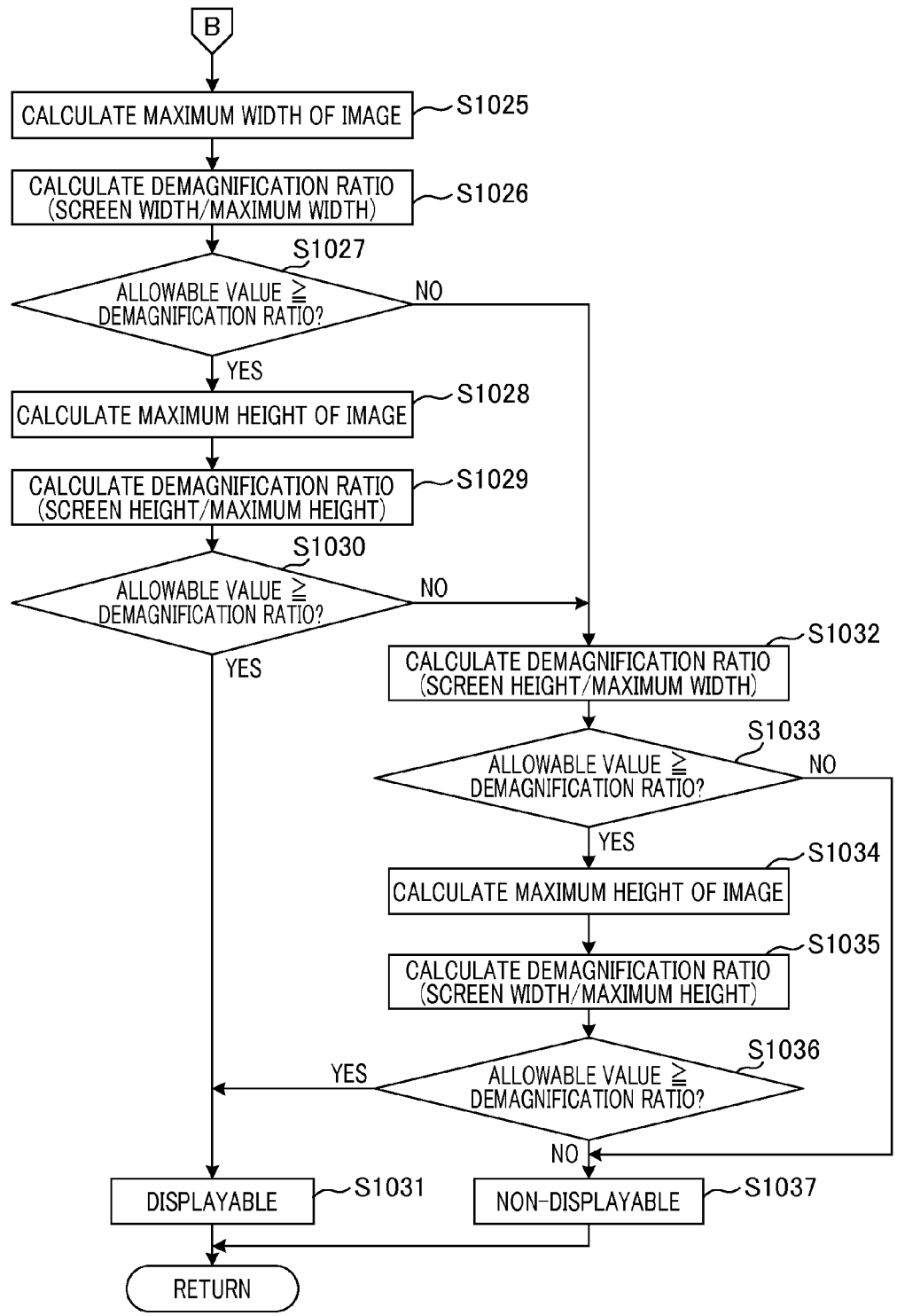
FIG. 14 is a flowchart illustrating single screen fitting determination processing.

FIGS. 12 to 14 are flowcharts illustrating single screen fitting determination processing. The processing in the flowchart is called from S906 shown in FIG. 11.

The processing program stored in the storage device 123 is loaded into the memory unit 122 and is executed by the CPU 121. In this manner, the CPU 121 controls the memory unit 122, the storage device 123, the input device 124, the display device 125, and the network interface 126 to thereby perform the processing of the flowchart shown in FIGS. 12 to 14.

The CPU executes single screen fitting determination processing and then determines whether or not the entire object can be displayed on the single screen of the portable terminal based on a predetermined condition for each object type. Then, the CPU determines whether or not the object is targeted for partial printing based on the determination result.

In S1001 shown in FIG. 12, the CPU acquires an object to be determined. Next, in S1002, the CPU determines the type of the object. If the CPU determines that the type of the object is a table object type, the process advances to S1003.

In S1003, the CPU calculates the screen width (the required width) which is required for displaying the entire table with the minimum allowable character size using the minimum allowable character size acquired in S810 shown in FIG. 9. The CPU calculates the sum of the character widths when each actual character in each row of the table is displayed with a character pitch of the minimum allowable character size to thereby calculate the width of the row with the largest value as the required width.

Next, in S1004, the CPU determines whether or not the acquired screen width of the portable terminal is equal to or greater than the required width. If the screen width is equal to or greater than the required width, the process advances to S1005. If the screen width is less than the required width, the process advances to S1008.

In S1005, the CPU sets the width of the table to the screen width on the terminal and then calculates the screen height (the required height) required for displaying the entire table with the minimum allowable character size. The CPU calculates the height of the table when each actual character in each row of the table is displayed to the full size of the screen width with the minimum allowable character size as the required height.

Next, in S1006, the CPU determines whether or not the acquired screen height of the portable terminal is equal to or greater than the required height. If the screen height is equal to or greater than the required height, the process advances to S1007. If the screen height is less than the required height, the process advances to S1008.

In S1007, the CPU determines that the table object can be displayed, and the process returns to the caller. In S1008, the CPU determines whether or not the acquired screen height of the portable terminal is equal to or greater than the required width. If the screen height is less than the required width, the process advances to S1011. If the screen height is equal to or greater than the required width, the process advances to S1009.

In S1009, the CPU calculates the required height of the table when the table is constituted with the minimum allowable character size by setting the width of the table as the screen height of the terminal. Next, in S1010, the CPU determines whether or not the acquired screen width of the portable terminal is equal to or greater than the required height calculated in S1009.

If the screen width is equal to or greater than the required height, the process advances to S1007. If the screen width is less than the required height, the process advances to S1011. In S1011, the CPU determines that the table object cannot be displayed, and the process returns to the caller.

From the description with reference to FIG. 12, the CPU compares the screen size needed when the portable terminal displays the table object with the minimum allowable character size with the screen size of the portable terminal. Then, if the CPU determines based on the comparison result that the table object cannot be displayed on a single screen even when the portable terminal displays the table object with the minimum allowable character size, the CPU extracts the table object as a partial printing candidate.

The aforementioned processing in S1008 to S1010 is processing for determining whether or not the table fits within the horizontal display screen obtained by rotating the portable terminal by 90 degrees if the CPU determines that the table does not fit within the vertical display screen of the portable terminal. If the entire table object fits within the horizontal display screen by rotating the table object by 90 degrees in association with the rotation of the portable terminal by 90 degrees, the CPU determines that the table object can be displayed. This prevents the table object from being output such as printing instead of displaying.

If the CPU determines in S1002 that the type of the object is a graphic object type, the process advances to S1012 shown in FIG. 13. In S1012, the CPU calculates the maximum width of the graphic. In this example, the CPU calculates the width of a circumscribed rectangle when the entire defined graphic data is displayed at full scale as the maximum width of the graphic.

Next, in S1013, the CPU determines a demagnification ratio for fitting the graphic object within the acquired screen width of the portable terminal. The CPU determines the demagnification ratio by dividing (the screen width) by (the graphic maximum width).

Next, in S1014, the CPU determines whether or not the demagnification ratio determined in S1013 is equal to or less than the maximum allowable demagnification ratio acquired in S811 shown in FIG. 9. If the demagnification ratio is equal to or less than the maximum allowable demagnification ratio, the process advances to S1015.

In S1015, the CPU calculates the maximum height of the graphic. As in S1012, the CPU calculates the height of a circumscribed rectangle when the entire defined graphic data is displayed at full scale as the maximum height of the graphic.

Next, in S1016, the CPU determines a demagnification ratio for fitting the graphic object within the acquired screen height of the portable terminal. The CPU determines the demagnification ratio by dividing (the screen height) by (the graphic maximum height). Next, in S1017, the CPU determines whether or not the demagnification ratio determined in S1016 is equal to or less than the maximum allowable demagnification ratio acquired in S811 shown in FIG. 8. If the demagnification ratio is equal to or less than the maximum allowable demagnification ratio, the process advances to S1018. If the demagnification ratio is greater than the maximum allowable demagnification ratio, the process advances to S1019.

In S1018, the CPU determines that the graphic object can be displayed, and the process returns to the caller. In S1019, the CPU determines a demagnification ratio for fitting the graphic object within the acquired screen height of the portable terminal. The CPU determines the demagnification ratio by dividing (the screen height) by (the graphic maximum width).

Next, in S1020, the CPU determines whether or not the demagnification ratio determined in S1019 is equal to or less than the maximum allowable demagnification ratio acquired in S811 shown in FIG. 9. If the demagnification ratio is equal to or less than the maximum allowable demagnification ratio, the process advances to S1021. If the demagnification ratio is greater than the maximum allowable demagnification ratio, the process advances to S1024.

In S1021, the CPU calculates the maximum height of the graphic. As in the processing in S1012, the CPU determines the maximum size of the graphic to thereby determine the maximum height of the graphic. Next, in S1022, the CPU determines a demagnification ratio for fitting the graphic object within the acquired screen width of the portable terminal. The CPU determines the demagnification ratio by dividing (the screen width) by (the graphic maximum height).

Next, in S1023, the CPU determines whether or not the demagnification ratio determined in S1022 is equal to or less than the maximum allowable demagnification ratio acquired in S811 shown in FIG. 9. If the demagnification ratio is equal to or less than the maximum allowable demagnification ratio, the process advances to S1018. If the demagnification ratio is greater than the maximum allowable demagnification ratio, the process advances to S1024. In S1024, the CPU determines that the graphic object cannot be displayed, and the process returns to the caller.

From the description with reference to FIG. 13, the CPU calculates the demagnification ratio of the graphic object when the graphic object is displayed on the portable terminal based on the size of the graphic object and the screen size of the portable terminal. The CPU compares the calculated demagnification ratio of the graphic object with the maximum allowable demagnification ratio. Then, if the CPU determines based on the comparison result that the graphic object cannot be displayed on a single screen even when the portable terminal displays the graphic object with the maximum allowable demagnification ratio, the CPU extracts the graphic object as a partial printing candidate.

The aforementioned processing in S S1019 to S1023 is processing for determining whether or not the graphic fits within the horizontal display screen obtained by rotating the portable terminal by 90 degrees if the CPU determines that the graphic does not fit within the vertical display screen of the portable terminal. If the entire graphic object fits within the horizontal display screen by rotating the graphic object by 90 degrees in association with the rotation of the portable terminal by 90 degrees, the CPU determines that the graphic object can be displayed. This eliminates the need to use other output methods such as printing.

If the CPU determines in S1002 that the type of the object is an image object type, the process advances to S1025 shown in FIG. 14. In S1025, the CPU calculates the maximum width of the image. In this example, the CPU calculates the width of a rectangle when the pixels of the defined image data are displayed at 1:1 magnification as the maximum width of the image.

Next, in S1026, the CPU determines a demagnification ratio for fitting the image within the acquired screen width of the portable terminal. The CPU determines the demagnification ratio by dividing (the screen width) by (the image maximum width). Next, in S1027, the CPU determines whether or not the demagnification ratio determined in S1026 is equal to or less than the maximum allowable demagnification ratio acquired in S811 shown in FIG. 9. If the demagnification ratio is equal to or less than the maximum allowable demagnification ratio, the process advances to S1028. If the demagnification ratio is greater than the maximum allowable demagnification ratio, the process advances to S1032.

In S1028, the CPU calculates the maximum height of the image. The CPU executes the same processing as that in S1025 to thereby calculate the height of a rectangle when the pixels of the defined image data are displayed at 1:1 magnification as the maximum height of the image.

Next, in S1029, the CPU determines a demagnification ratio for fitting the image within the acquired screen height of the portable terminal. The CPU determines the demagnification ratio by dividing (the screen height) by (the image maximum height). Next, in S1030, the CPU determines whether or not the demagnification ratio determined in S1029 is equal to or less than the maximum allowable demagnification ratio acquired in S811 shown in FIG. 9. If the demagnification ratio is equal to or less than the maximum allowable demagnification ratio, the process advances to S1031. If the demagnification ratio is greater than the maximum allowable demagnification ratio, the process advances to S1032.

In S1031, the CPU determines that the image can be displayed, and the process returns to the caller. In S1032, the CPU determines a demagnification ratio for fitting the image within the acquired screen height of the portable terminal. The CPU determines the demagnification ratio by dividing (the screen height) by (the image maximum width).

Next, in S1033, the CPU determines whether or not the demagnification ratio determined in S1032 is equal to or less than the maximum allowable demagnification ratio acquired in S811. If the demagnification ratio is equal to or less than the maximum allowable demagnification ratio, the process advances to S1034.

In S1034, the CPU calculates the maximum height of the image. The CPU executes the same processing as that in S1025 to thereby determine the maximum size of the image as the maximum height of the image.

Next, in S1035, the CPU determines a demagnification ratio for fitting the image within the acquired screen width of the portable terminal. The CPU determines the demagnification ratio by dividing (the screen width) by (the image maximum height). Next, in S1036, the CPU determines whether or not the demagnification ratio determined in S1035 is equal to or less than the maximum allowable demagnification ratio acquired in S811 shown in FIG. 9. If the demagnification ratio is equal to or less than the maximum allowable demagnification ratio, the process advances to S1031. If the demagnification ratio is greater than the maximum allowable demagnification ratio, the process advances to S1037. In S1037, the CPU determines that the image cannot be displayed, and the process returns to the caller.

From the description with reference to FIG. 14, the CPU calculates the demagnification ratio of the image object when the image is displayed on the portable terminal based on the size of the image and the screen size of the portable terminal. The CPU compares the calculated demagnification ratio of the image with the maximum allowable demagnification ratio. Then, if the CPU determines based on the comparison result that the image cannot be displayed on a single screen even when the portable terminal displays the image with the maximum allowable demagnification ratio, the CPU extracts the image as a partial printing candidate.

The aforementioned processing in S S1032 to S1036 is processing for determining whether or not the image fits within the horizontal display screen obtained by rotating the portable terminal by 90 degrees if the CPU determines that the image does not fit within the vertical display screen of the portable terminal. If the entire image object fits within the horizontal display screen by rotating the image object by 90 degrees in association with the rotation of the portable terminal by 90 degrees, the CPU determines that the image object can be displayed. This eliminates the need to use other output methods such as printing.

Figure 15:
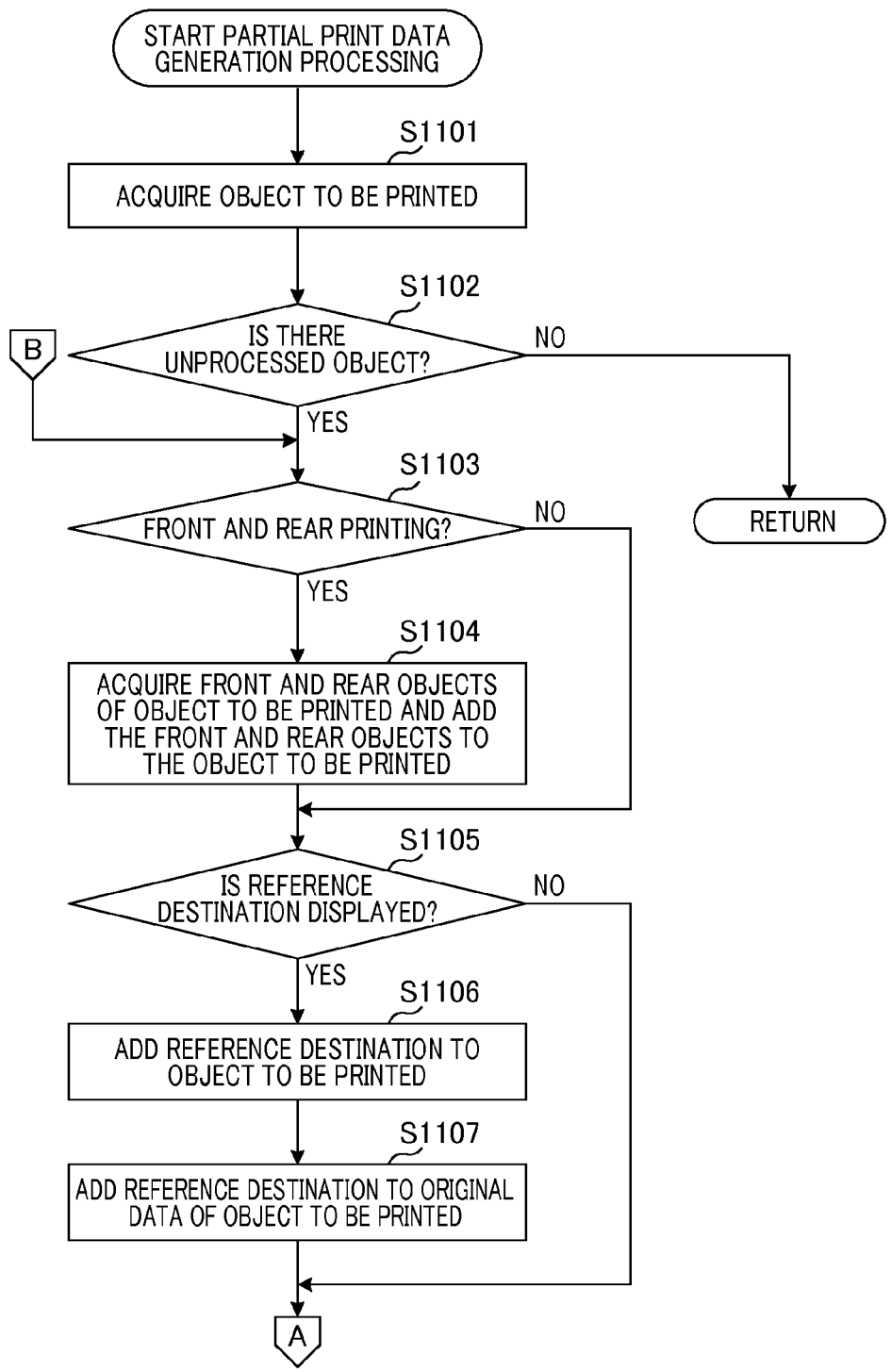
FIG. 15 is a flowchart illustrating partial print data generation processing.
Figure 16:
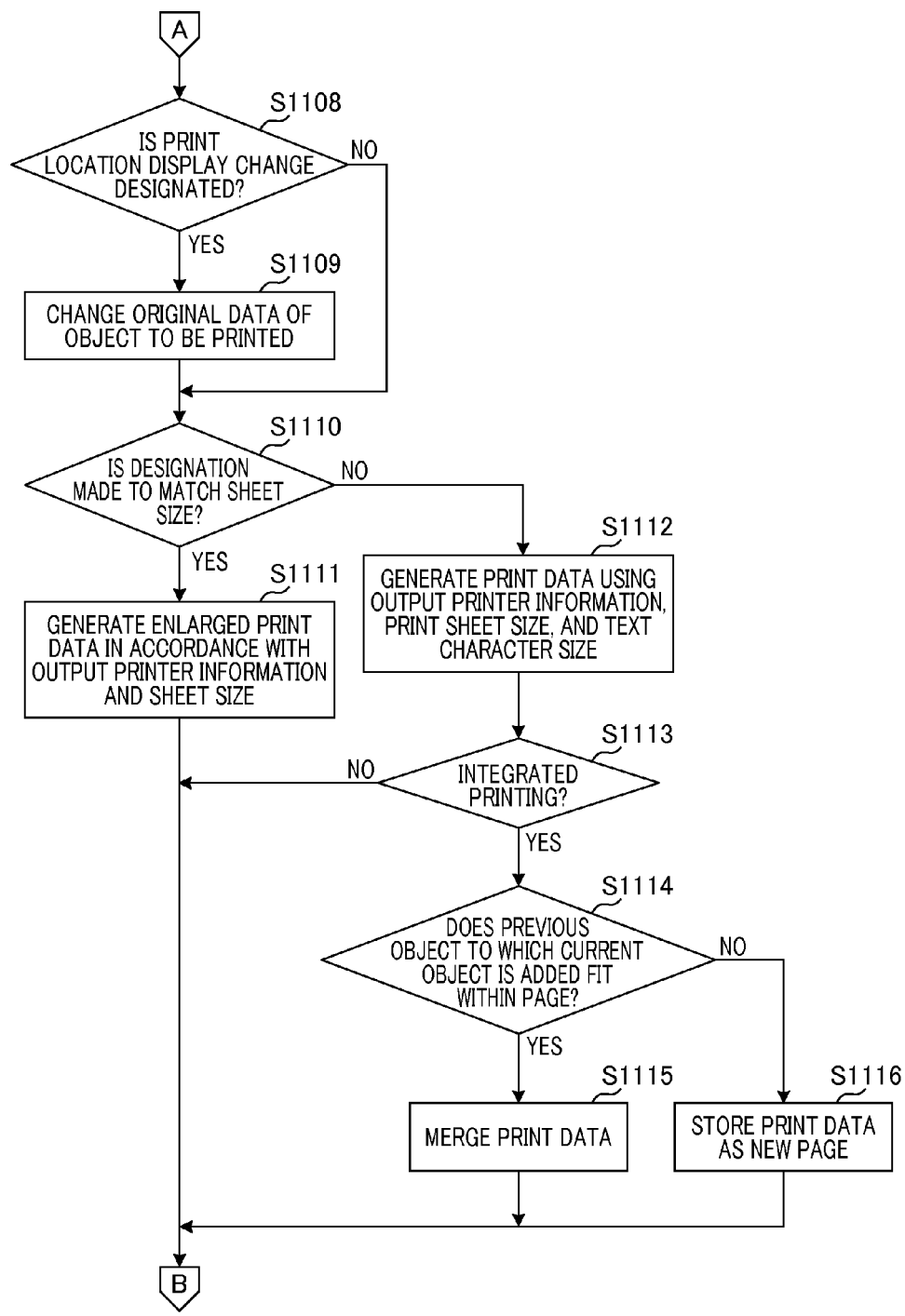
FIG. 16 is a flowchart illustrating partial print data generation processing.

FIGS. 15 and 16 are flowcharts illustrating partial print data generation processing. The processing in the flowchart shown in FIG. 11 is called from S819 shown in FIG. 10.

The processing program stored in the storage device 123 is loaded into the memory unit 122 and is executed by the CPU 121. In this manner, the CPU 121 controls the memory unit 122, the storage device 123, the input device 124, the display device 125, and the network interface 126 to thereby perform the processing of the flowchart shown in FIG. 15 and FIG. 16. In other words, through the processing, the CPU functions as a generating unit that generates print data targeted for listing-printing by the printer 230 based on an object to be printed.

In S1101 shown in FIG. 15, the CPU acquires an object to be printed in sequence. Next, in S1102, the CPU determines whether or not there is an unprocessed object to be printed. If there is no unprocessed object to be printed, the process returns to the caller. If there is an unprocessed object to be printed, the process advances to S1103.

In S1103, the CPU determines whether or not there is a setting on the acquired front and rear print setting field 517. If the CPU determines that YES in S1103, that is, there is a setting on the acquired front and rear print setting field 517, the process advances to S1104. If the CPU determines that NO in S1103, that is, there is no setting on the acquired front and rear print setting field 517, the process advances to S1105.

In S1104, the CPU extracts the front and rear objects of an object to be printed and adds the front and rear objects to the object to be printed. Next, in S1105, the CPU determines whether or not there is a setting on the acquired reference destination display setting field 519. If the CPU determines that YES in S1105, that is, there is a setting on the acquired reference destination display setting field 519, the process advances to S1106. If the CPU determines that NO in S1105, that is, there is no setting on the acquired reference destination display setting field 519, the process advances to S1108 shown in FIG. 16.

In S1106, the CPU adds the reference destination to the object to be printed. The CPU adds the "printing 1" 403 shown in FIG. 5B as information indicating a reference destination to the object to be printed. The adding processing means to add information, which indicates a portion corresponding to print data for display data corresponding to an object to be printed, as print data reference destination information to print data.

Next, in S1107, the CPU adds the reference destination to original data of the object to be printed. The CPU adds "see printing 1" shown in FIG. 5A as reference destination information to original data. The adding processing means to add information indicating print data as reference destination information from a portion corresponding to print data of display data displayed on the portable terminal to display data.

Next, in S1108 shown FIG. 16, the CPU determines whether or not a simple display change setting is made on the acquired simple display setting field 518. If the CPU determines that YES in S1108, that is, there is a change designation, the process advances to S1109. If the CPU determines that NO in S1108, that is, there is no change designation, the process advances to S1110.

In S1109, the CPU causes the print data generating unit 225 to change original data of the object to be printed to simple display mode. The CPU generates data targeted for simple display shown in, for example, FIG. 5C or FIG. 5D. In other words, the CPU executes generation processing for generating display data corresponding to an object to be output to thereby change a portion corresponding to print data from among the generated display data.

Next, in S1110, the CPU determines whether or not there is a setting on the print setting field 515 to match the acquired sheet size. If the CPU determines that YES in S1110, that is, there is a setting, the process advances to S1111. If the CPU determines that NO in S1110, that is, there is no setting, the process advances to S1112.

In S1111, the CPU generates print data enlarged to match the sheet size of the sheet size 513 based on the acquired output printer information on the output destination printer selecting field 512 and the acquired sheet size on the sheet size 513, and the process returns to S1102 shown in FIG. 15.

In S1112, the CPU generates print data corresponding to the acquired output printer information on the output destination printer selecting field 512, the acquired sheet size on the sheet size 513, and the acquired print text character size on the print text character size 514.

Next, in S1113, the CPU determines whether or not there is a setting on the acquired integrated print setting field 516. If the CPU determines that YES in S1113, that is, an integrated setting is made on the acquired integrated print setting field 516, the process advances to S1114. If the CPU determines that NO in S1113, that is, no integrated setting is made on the acquired integrated print setting field 516, the process returns to S1102 shown in FIG. 15.

In S1114, the CPU determines whether or not objects fit within a page even if the current object to be printed is added to the previously created object to be printed. If the objects fit within a page even if the current object to be printed is added to the previously created object to be printed, the process advances to S1115. If the objects do not fit within a page even if the current object to be printed is added to the previously created object to be printed, the process advances to S1116.

In S1115, the CPU merges the current object to be printed to the previously created object to be printed, the process returns to S1102. In S1116, the CPU stores the current object to be printed as new print page data, and the process returns to S1102 shown in FIG. 15.

In the information processing system of the present embodiment, the storage server 220 determines whether or not data is suitable for being displayed on the portable terminal 210 based on a data retrieval request from the document data acquisition software installed in the portable terminal 210, and converts a portion unsuitable for being displayed on the portable terminal 210 into print data. In this manner, an object, which is difficult to be viewed when the object is displayed as it is on the portable terminal 210, is printed out, so that an environment in which the content of document data is readily readable can be provided to a user. In the information processing system of the first embodiment, the printer 230 prints out data which cannot be displayed on a single screen. The information processing system can also readily realize to generate data corresponding to another output device different from the printer 230 and display the generated data on the another output device. Examples of another output device include display equipment having a display larger than that on the portable terminal 210, a projector, and the like.

Second Embodiment

When a storage server stores document data, the information processing system according to the second embodiment performs document data conversion in advance such that display suitable for a plurality of portable terminals can be achieved. Note that the hardware configuration of the devices constituting the information processing system of the second embodiment is the same as that of the devices described with reference to FIG. 1.

Figure 17:
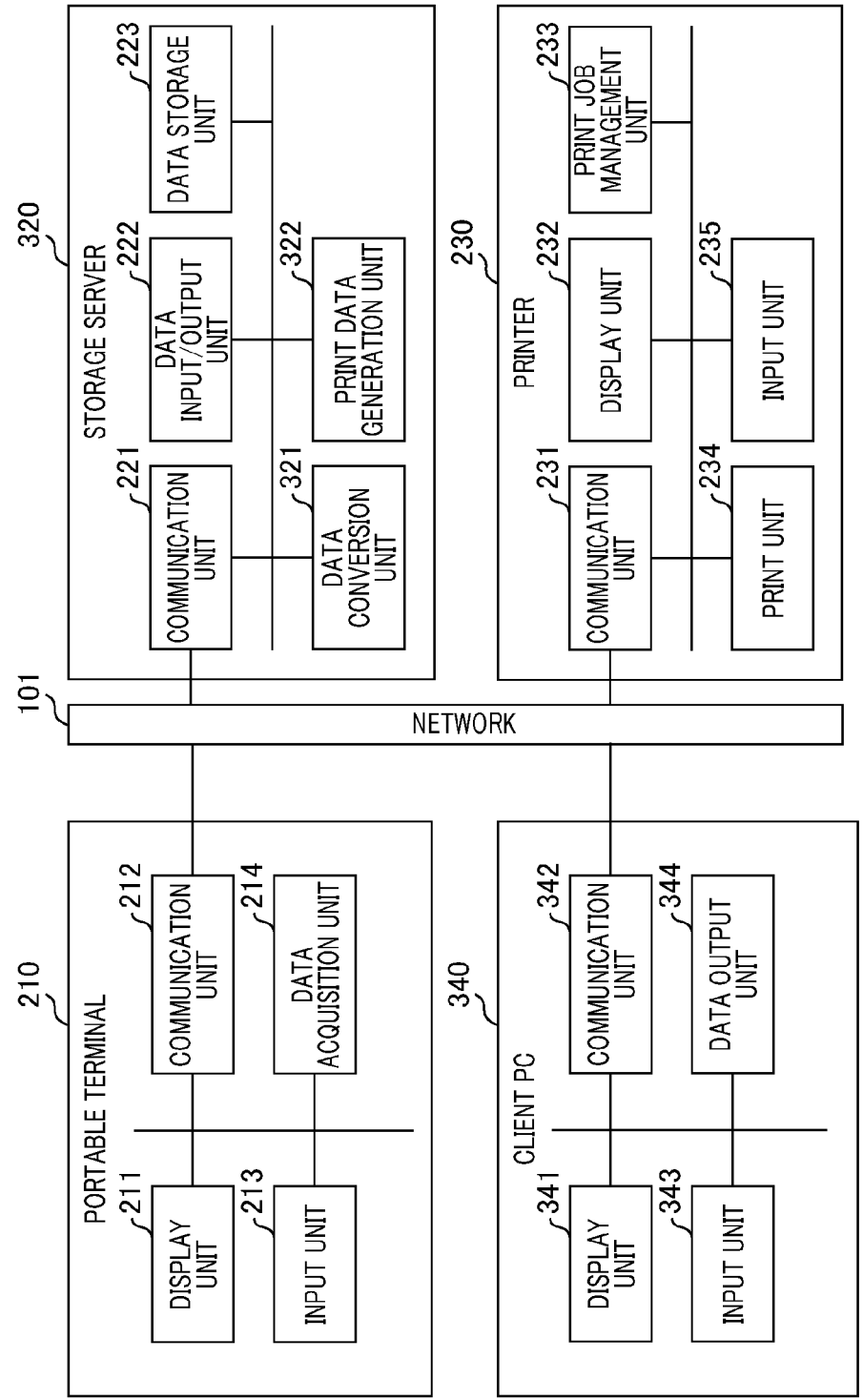
FIG. 17 illustrates an exemplary configuration of an information processing system according to a second embodiment.

FIG. 17 is a diagram illustrating an exemplary configuration of an information processing system according to a second embodiment. The information processing system includes a portable terminal 210, a storage server 320, a printer 230, and a client PC 340. The portable terminal 210, the storage server 320, and the printer 230 communicate with each other via the network 101. The portable terminal 210 is the same as the portable terminal 210 shown in FIG. 2. Also, the printer 230 is the same as the printer 230 shown in FIG. 2.

In the information processing system, the client PC 340 inputs (submits) document data to the storage server 320. The storage server 320 performs data conversion upon storing the document data. More specifically, the storage server 320 generates and accumulates display data and print data for each display screen size and each display condition of a plurality of portable terminals. When the storage server 320 receives a data retrieval request from the portable terminal 210, the storage server 320 outputs document data corresponding to the display screen size and the display condition of the portable terminal 210. The printer 230 outputs print data based on the print request from the portable terminal 210 or the storage server 320.

The storage server 320 includes a communication unit 221, a data input/output unit 222, a data storage unit 223, a data conversion unit 321, and a print data generating unit 322. The communication unit 221, the data input/output unit 222, and the data storage unit 223 are the same as the communication unit 221, the data input/output unit 222, and the data storage unit 223 shown in FIG. 2, respectively. The data conversion unit 321 performs document data conversion when the client PC 340 submits document data. More specifically, the data conversion unit 321 executes extraction processing for extracting an object targeted for partial printing for each predetermined display screen size and each predetermined display condition. The print data generating unit 322 executes print data generation processing and display data generation processing for each predetermined display screen size and each predetermined display condition. The data storage unit 223 stores the generated print data and display data in association with predetermined display screen size and display condition.

The client PC 140 includes a display unit 341, a communication unit 342, an input unit 343, and a data output unit 344. The display unit 341 performs terminal display. The communication unit 342 is connected to the network 101 so as to perform network communication with other devices. The input unit 343 inputs data and an instruction in accordance with a user operation. The data output unit 344 outputs document data.

FIGS. 18A and 18B are diagrams illustrating information used for data conversion processing performed by a storage server. In this example, screen and character size information shown in FIG. 18A and condition information shown in FIG. 18B are used for data conversion processing.

The screen and character size information shown in FIG. 18A is information indicating a combination of a predefined screen size and the minimum allowable character size used on the portable terminal display. The screen and character size information is stored in the data storage unit 223. In FIG. 18A, the minimum allowable character size is tabulated as a character size. For example, a combination 1 indicates a combination of the screen width size of 2 inches, the screen height size of 3 inches, and the minimum allowable character size of 5 points. Note that the minimum allowable character size is an example of a display condition. The display condition to which the present invention is applied is not limited to the minimum allowable character size.

The condition information shown in FIG. 18B is information indicating a condition used for extracting a predefined object targeted for partial printing and a print condition used upon partial printing. The condition information is stored in the data storage unit 223.

In FIG. 18B, a demagnification ratio 1301 is used for designating a maximum allowable demagnification ratio when a graphic or an image is zoomed out on the portable terminal display. A target object 1302 is used for designating which object is to be determined as a print target. Here, the target object is one or a plurality of combinations of a table object, a graphic object, an image object, and a fixed layout object. A print format 1303 is used for designating output print format. Here, the print format is a print format which is recognized by a printer, such as a PDF language, a PS language, or a PDL language. When a plurality of printers is provided, a commonly-used print format is set in advance.

A sheet size 1304 is used for designating a sheet size. A print character size 1305 is used for designating a text character size upon printing. A sheet size matching 1306 is used for designating whether or not an object to be printed is printed in conformity to a sheet size. An integrated printing 1307 is used for designating whether or not a plurality of objects to be printed is integrally printed on one page. A front and rear printing 1308 is used for designating whether or not printing is made by including the front and rear portions of an object to be printed. Here, if the front and rear objects are text objects, the range of the front and rear portions is a character string of a predetermined number of rows, e.g., 3 rows. If the front and rear objects are objects other than text objects, the worth of one object is the range of the front and rear portions. A printed location simple display 1309 is used for designating whether or not a printed location is displayed in a simple fashion. A reference destination display 1310 is used for designating whether or not reference destination is displayed on each of the printed matter and the terminal display.

Figure 19:
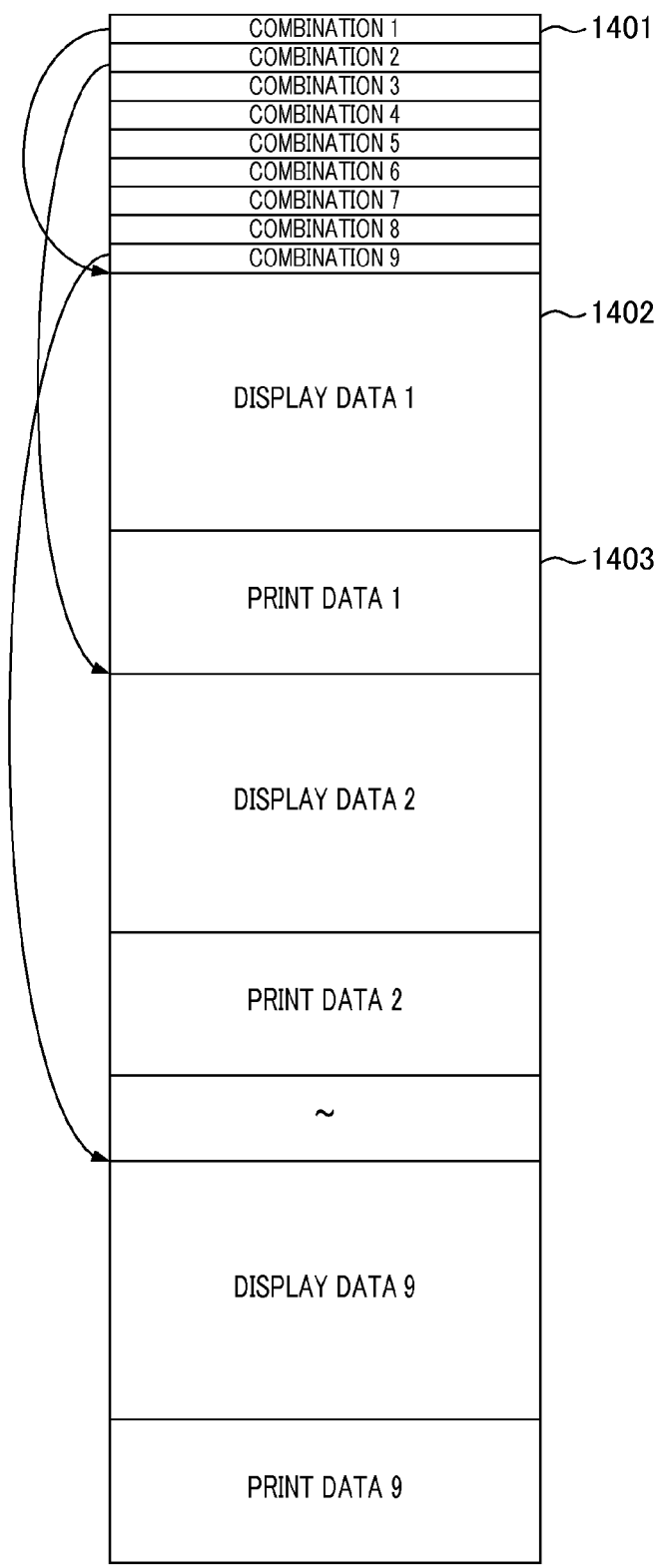
FIG. 19 illustrates an exemplary data holding format.

FIG. 19 is a diagram illustrating an exemplary data holding format according to the present embodiment. Display data 1 and print data 1 are generated with respect to the combination 1 of the screen and character size information shown in FIG. 18A. A pointer 1401 to the combination 1, a pointer 1402 to the display data 1, and a pointer 1403 to the print data 1 are stored in the data storage unit 223. As in the combination 1, display data and print data are generated with respect to each of combinations 2 to 9. These display data and print data are stored in the data storage unit 223.

Figure 20:
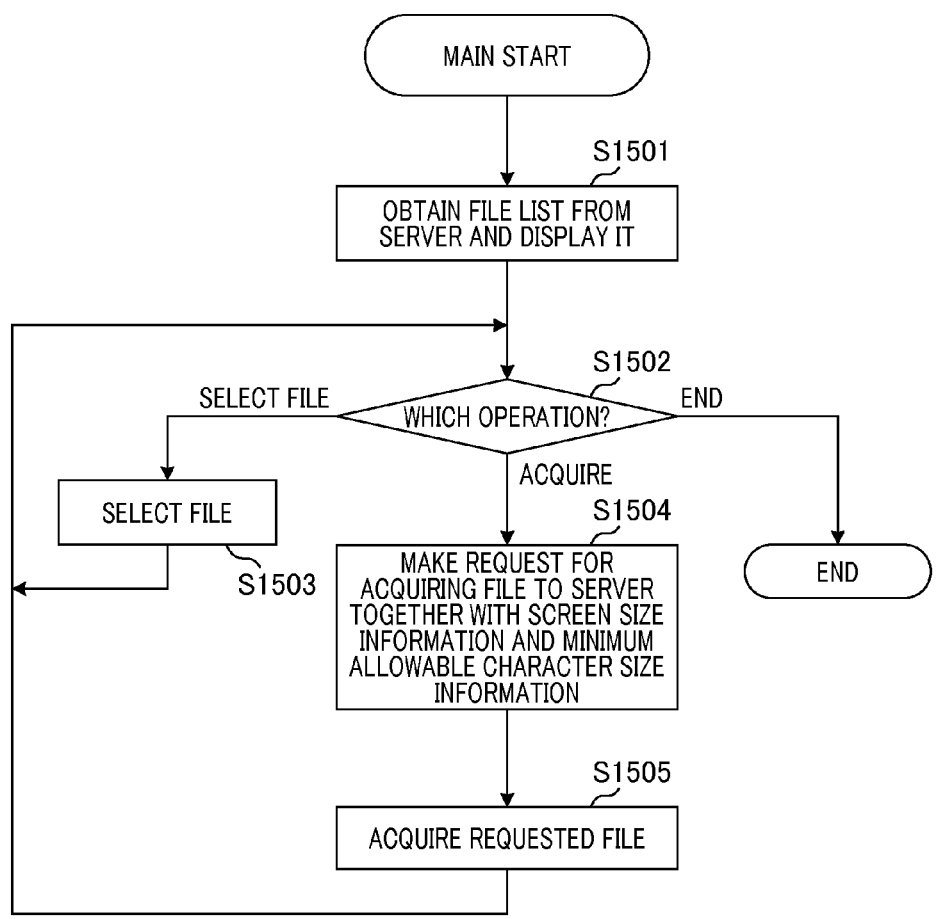
FIG. 20 is a flowchart illustrating document data acquisition processing.

FIG. 20 is a flowchart illustrating document data acquisition processing according to the present embodiment. In the present embodiment, the document data acquisition software installed in the portable terminal 210 acquires document data from the storage server 320.

More specifically, the document data acquisition software stored in the storage device 113 is loaded into the memory unit 112 and is executed by the CPU 111. In this manner, the CPU 111 controls the memory unit 112, the storage device 113, the input device 114, the display device 115, and the network interface 116 to thereby perform the processing of the flowchart shown in FIG. 20.

Firstly, in S1501, the CPU obtains a document data list registered on the storage server 320 from the storage server 320, and then displays the document data list on the display unit 211. More specifically, the CPU displays the document data acquisition screen shown in FIG. 6A. Next, in S1502, the CPU determines an input operation via the input unit 213.

If the input operation is a file selecting operation, the process advances to S1503. Then, the CPU stores the selected file name, and the process returns to S1502. If the input operation is a document data acquiring operation, the process advances to S1504. Then, the CPU makes a request, to the storage server 320, for acquiring document data having the selected file name together with screen size information and minimum allowable character size information of the portable terminal 210. Here, the request is processed in S1616 shown in FIG. 21. Next, in S1505, the CPU acquires the document data requested to the storage server 320, and the process returns to S1502. Here, document data acquisition corresponds to the reply in S1620 shown in FIG. 21. On the other hand, if the CPU determines in S1502 that the input designation is an ending operation, the processing performed by document data acquisition software ends.

Figure 21:
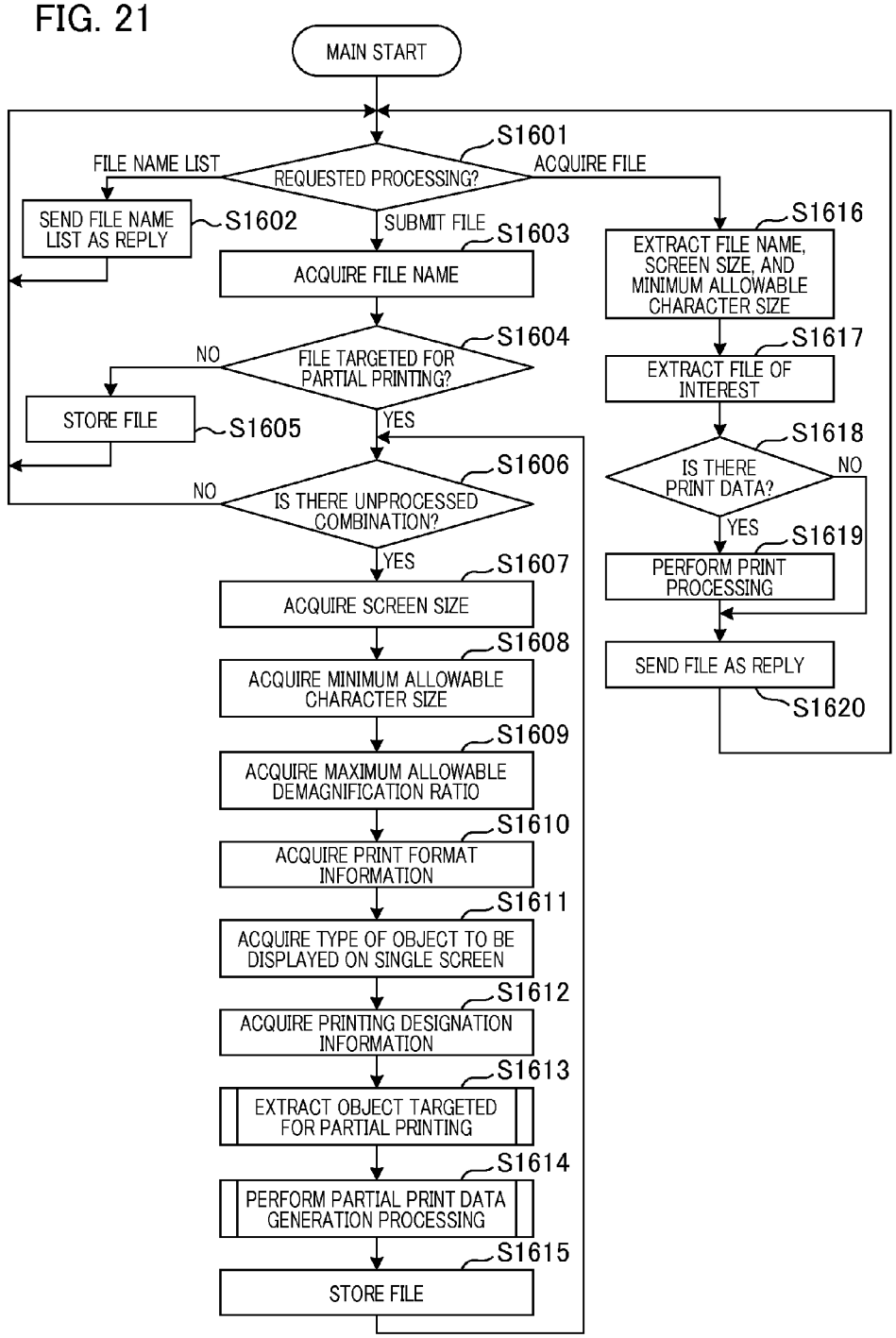
FIG. 21 is a flowchart illustrating operation processing performed by a storage server according to the second embodiment.

FIG. 21 is a flowchart illustrating operation processing performed by a storage server according to the second embodiment. In FIG. 21, a description will be given by taking an example of operation processing performed when the storage server 320 receives data submission from the client PC 340 or receives a file acquiring request from the portable terminal 210. The processing of the flowchart shown in FIG. 21 is operated in synchronization with the operation processing performed by the portable terminal 210 described with reference to FIG. 20.

The processing program stored in the storage device 123 is loaded into the memory unit 122 and is executed by the CPU 121. In this manner, the CPU 121 controls the memory unit 122, the storage device 123, the input device 124, the display device 125, and the network interface 126 to thereby perform the processing of the flowchart shown in FIG. 21.

In S1601, the CPU determines the request from the exterior. An example of the request from the exterior includes a request from the portable terminal 110 or a request from the client PC 340. If the request from the exterior is a file name list acquiring request, the process advances to S1602. Then, the CPU transmits the file name of document data stored in the data storage unit 223 back to the inquiry source via the data input/output unit 222, and the process returns to S1601. In the present embodiment, the inquiry source is the portable terminal 210. If the request from the exterior is a file submitting request, the process advances to S1603. Then, the CPU acquires the file name of the submitted document data. In the present embodiment, the request source for submitting the document data is the client PC 340.

Next, in S1604, the CPU determines whether or not the submitted document file is a file targeted for partial printing. The CPU determines whether or not the submitted document file is a file targeted for partial printing based on file extension. In the present embodiment, an EPUB file is a file targeted for partial printing. Thus, if the file extension is the EPUB extension, the CPU determines that the file is a file targeted for partial printing. If the file extension is not the EPUB extension, the CPU determines that the file is not a file targeted for partial printing. If the file is not a file targeted for partial printing, the process advances to S1605. Then, the CPU stores the submitted document file as it is in the data storage unit 223, and the process returns to S1601.

If the file is a file targeted for partial printing, the CPU extracts the screen and character size information shown in FIG. 18A and the condition information shown in FIG. 18B from the storage unit. Then, the CPU performs the processing from S1606 to S1615 for the combinations 1 to 9 included in screen and character size information in sequence.

Firstly, In S1606, the CPU determines whether or not there is an unprocessed combination. If there is no unprocessed combination, the process returns to S1601. If there is an unprocessed combination, the process advances to S1607, and processing for an unprocessed combination is performed.

In S1607, the CPU acquires screen size information upon processing an unprocessed combination. Next, in S1608, the CPU acquires minimum allowable character size information upon processing an unprocessed combination from screen and character size information.

Next, in S1609, the CPU acquires the maximum allowable demagnification ratio designated by the demagnification ratio 1301 from condition information. Next, in S1610, the CPU acquires information relating to the print format designated by the print format 1301 from condition information. In S1611, the CPU acquires information which is designated by the target object 1302 and relates to a target object to be displayed on a single screen on the portable terminal from condition information. The target object is one or a plurality of combinations of a table object, a graphic object, an image object, and a fixed layout object.

Next, in S1612, the CPU acquires designation information upon partial printing. Partial printing designation information includes information designated by the sheet size 1304, the print character size 1305, the sheet size matching 1306, the integrated printing 1307, the front and rear printing 1308, the printed location simple display 1309, and the reference destination display 1310 which are contained within condition information.

Next, in S1613, the CPU performs extraction processing for extracting an object targeted for partial printing described with reference to FIG. 11. In the second embodiment, the data conversion unit 321 of the storage server 320 executes extraction processing for extracting an object targeted for partial printing.

Next, in S1614, the CPU performs partial print data generation processing described with reference to FIG. 15 and FIG. 16. Then, the CPU stores the document data converted in S1615 in the data storage unit 223, and the process returns to S1606. From the description with reference to FIG. 21, the CPU acquires a plurality of predefined screen sizes and a predefined display condition (S S1606 to S1610). The CPU associates objects targeted for partial printing with the acquired screen sizes based on the objects extracted by using the acquired screen sizes and the acquired display conditions to thereby generate print data (S S1614 and S1615).

On the other hand, if the CPU determines in S1601 that the request from the exterior is a file acquiring request, the process advances to S1616. Then, the CPU acquires a document file name, screen size information, and minimum allowable character size information. In the second embodiment, the portable terminal 210 makes the request in the processing in S1504 shown in FIG. 20.

Next, in S1617, the CPU extracts a file for display data and print data corresponding to the combination of interest in screen and character size information from files for display data and print data stored in the data storage unit 223 (FIG. 19).

Next, in S1618, the CPU determines whether or not print data is included in the extracted file. If the CPU determines that print data is not included in the extracted file, the process advances to S1620. If the CPU determines that print data is included in the extracted file, the process advances to S1619, and the CPU performs print processing. More specifically, the CPU transmits data created in print format designated by the print format 1303 within condition information to the printer 230 via the communication unit 221 to thereby perform print processing.

Next, in S1620, the CPU returns the designated document data, and the process returns to S1601. Here, the returned document data is received by the portable terminal serving as the request source in S1505 shown in FIG. 20.

In the information processing system of the second embodiment, data suitable for being displayed on the portable terminal is created in advance by the storage server, so that an environment in which the data is immediately readable on the portable terminal can be achieved when a data retrieval request is made from the portable terminal. In the present embodiment, the information processing system performs display by printing. The information processing system can also readily realize to generate data corresponding to another output device and display the generated data on the another output device.

Third Embodiment

In the information processing system of the third embodiment, the portable terminal acquires document data from the storage server to thereby execute data conversion processing. Note that the hardware configuration of the devices constituting the information processing system of the third embodiment is the same as that of the devices described with reference to FIG. 1.

Figure 22:
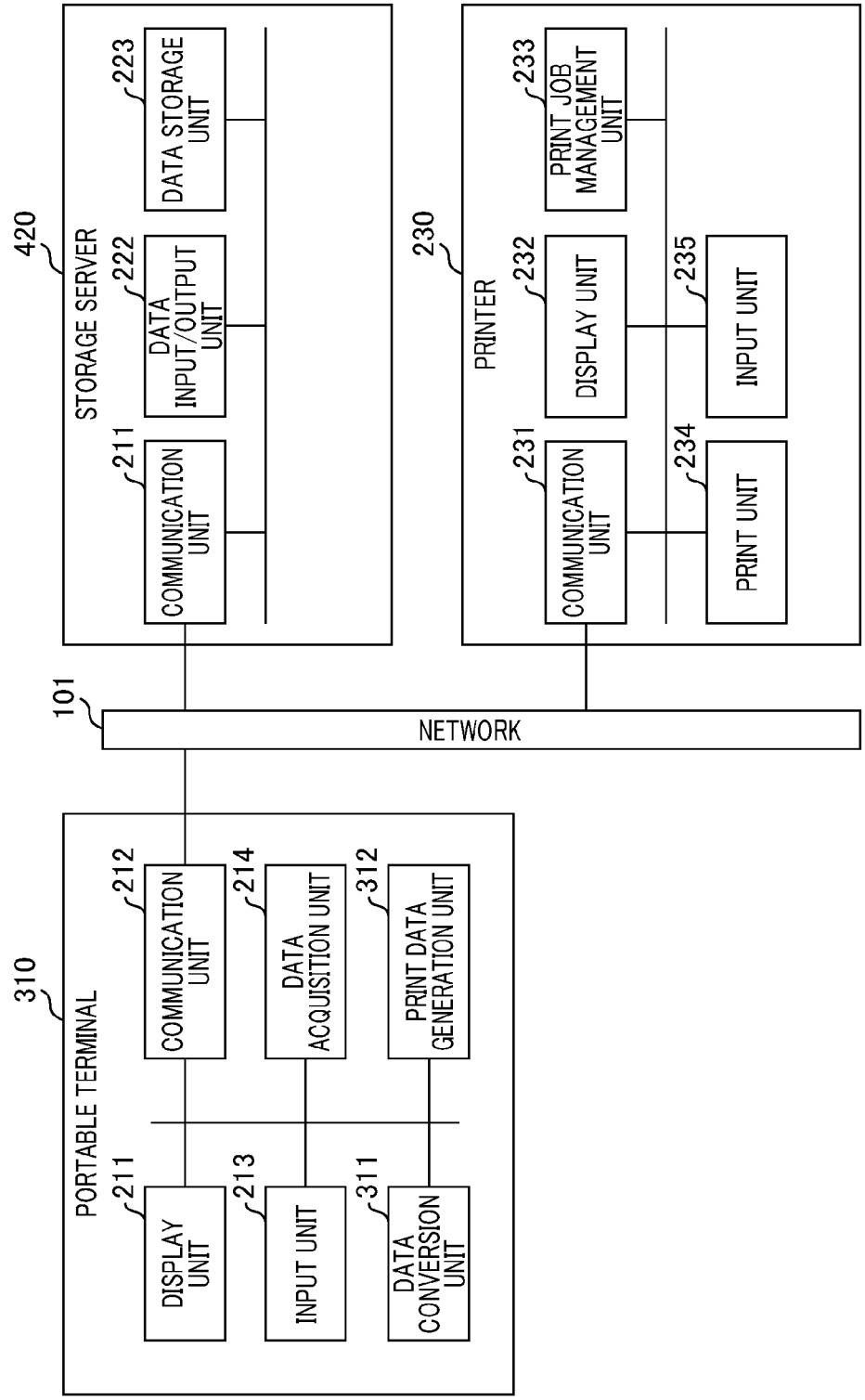
FIG. 22 is a diagram illustrating an exemplary configuration of an information processing system according to a third embodiment.

FIG. 22 is a diagram illustrating an exemplary configuration of an information processing system according to a third embodiment. The information processing system includes a portable terminal 310, a storage server 420, and a printer 230. The portable terminal 310, the storage server 420, and the printer 230 communicate with each other via the network 101. The printer 230 is the same as the printer 230 shown in FIG. 2. Also, the communication unit 221, the data input/output unit 222, and the data storage unit 223 that are provided in the storage server 420 are the same as the communication unit 221, the data input/output unit 222, and the data storage unit 223 that are provided in the storage server 220 shown in FIG. 2.

The portable terminal 310 includes a display unit 211, a communication unit 212, an input unit 213, and a data acquiring unit 214, a data conversion unit 311, and a print data generating unit 312. The display unit 211, the communication unit 212, the input unit 213, and the data acquiring unit 214 are the same as the display unit 211, the communication unit 212, the input unit 213, and the data acquiring unit 214 that are provided in the portable terminal 210 shown in FIG. 2, respectively. When the data acquiring unit 214 acquires document data from the storage server 420, the data conversion unit 311 performs conversion processing for document data. The data conversion unit 311 performs the same data conversion processing as that performed by the data conversion unit 224 provided in the storage server 220 shown in FIG. 2. The print data generating unit 312 performs the same print data generation processing as that performed by the print data generating unit 225 provided in the storage server 220 shown in FIG. 2.

Figure 23:
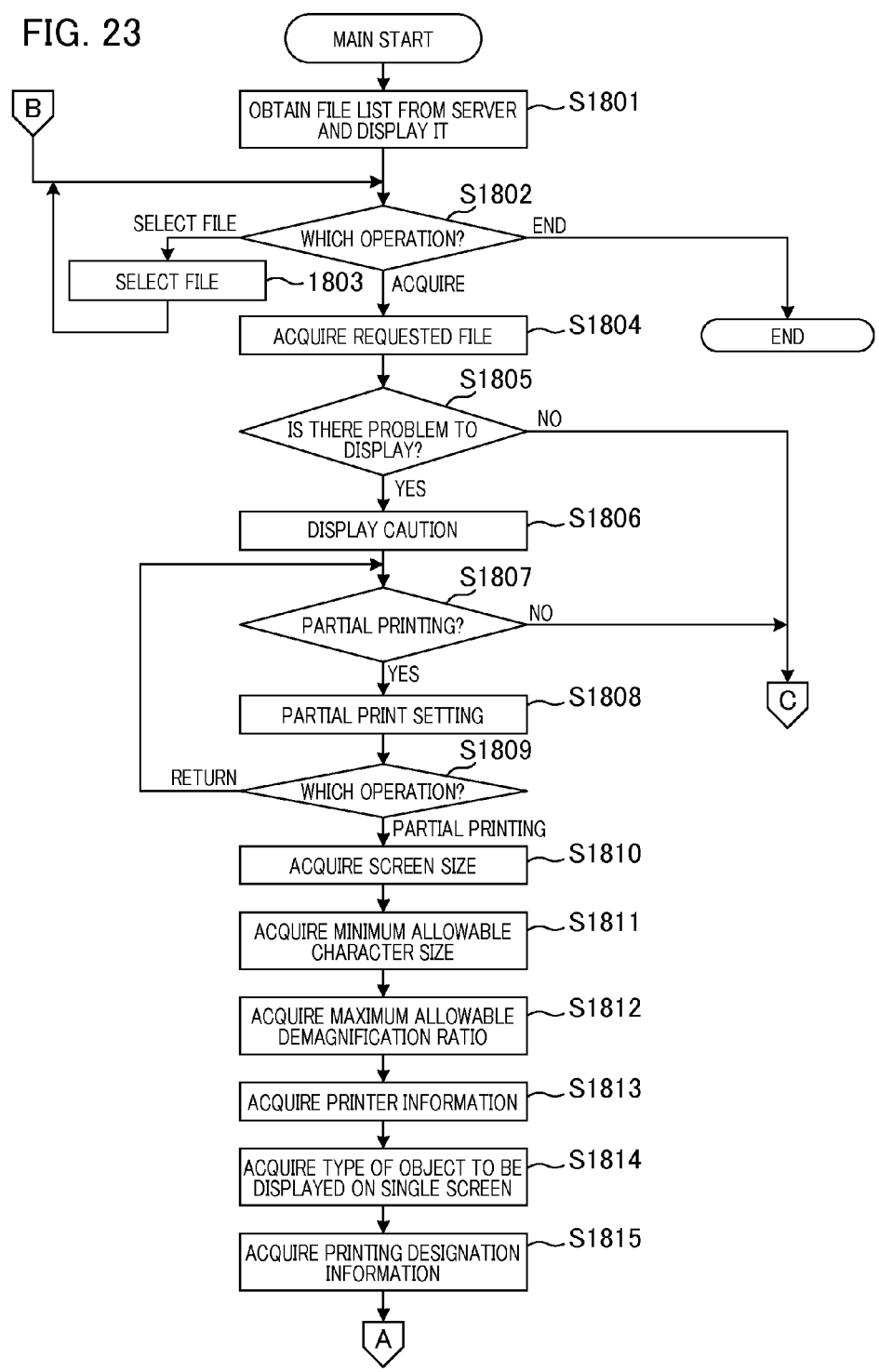
FIG. 23 is a flowchart illustrating operation processing performed by a portable terminal.
Figure 24:
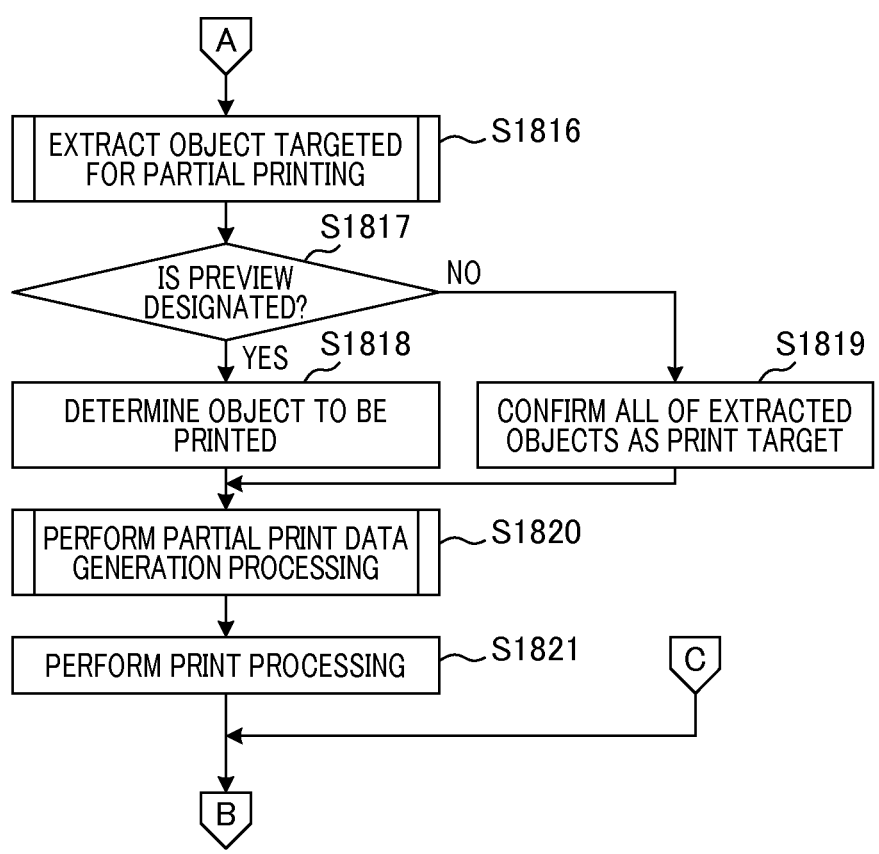
FIG. 24 is a flowchart illustrating operation processing performed by a portable terminal.

FIG. 23 and FIG. 24 are flowcharts illustrating operation processing performed by the portable terminal of the third embodiment. In FIG. 23 and FIG. 24, a description will be given by taking an example of processing performed by document data acquisition software when the portable terminal 310 acquires document data from the storage server 420.

The document data acquisition software stored in the storage device 113 is loaded into the memory unit 112 and is executed by the CPU 111. In this manner, the CPU 111 controls the memory unit 112, the storage device 113, the input device 114, the display device 115, and the network interface 116 to thereby perform the processing of the flowchart shown in FIG. 23 and FIG. 24.

Firstly, in S1801, the CPU obtains a document data list registered on the storage server 420 from the storage server 420, and then displays the document data list on the display unit 211. More specifically, the CPU displays the document data acquisition screen shown in FIG. 6A.

Next, in S1802, the CPU determines an input operation via the input unit 213. If the input operation is an ending operation, the process ends. If the input operation is a file selecting operation, the process advances to S1803. Then, the CPU stores the selected file name, and the process returns to S1802. If the input operation is a document data acquiring operation, the process advances to S1804. Then, the CPU makes a request for acquiring document data having the selected file name to the storage server 420 to thereby acquire the document data.

Next, in S1805, the CPU determines whether or not there is a possibility to be problematic for displaying the acquired document data on the portable terminal. The CPU determines whether or not the requested document file is a file targeted for partial printing using a file extension. In this example, the file targeted for partial printing is an EPUB file. If the file is a file targeted for partial printing, the CPU determines that there is a possibility to be problematic for displaying the acquired document data on the portable terminal, and the process advances to S1806. If the file is not a file targeted for partial printing, the CPU determines that there is no possibility to be problematic for displaying the acquired document data on the portable terminal, and the process returns to S1802.

In S1806, the CPU displays the caution display screen described with reference to FIG. 6B. Next, in S1807, the CPU determines whether or not an input designation is a designation for performing partial printing via the input unit 213. If the input designation is a designation not to perform partial printing, the process returns to S1802. If the input designation is a designation for performing partial printing, the process advances to S1808. Then, the CPU displays the partial print setting screen described with reference to FIG. 6C to thereby set various conditions.

Next, in S1809, the CPU determines an input operation. If the input operation is a return operation, the process returns to S1807. If the input operation is a partial printing execution designation, the process advances to S1810, and the CPU acquires screen size information of the portable terminal 310.

Next, in S1811, the CPU acquires minimum allowable character size information which is used for displaying an image on the portable terminal. Next, in S1812, the CPU acquires maximum allowable demagnification ratio information which is used for displaying an image on the portable terminal. Next, in S1813, the CPU acquires output printer information upon partial printing. Next, in S1814, the CPU acquires designation information for designating a target object to be displayed on a single screen on the portable terminal. The target object is one or a plurality of combinations of a table object, a graphic object, an image object, and a fixed layout object.

Next, in S1815, the CPU acquires partial printing designation information upon partial printing. Partial printing designation information includes a sheet size, a text character size upon printing, and a designation as to whether or not an object to be printed is printed in conformity to a sheet size. Partial printing designation information also includes a designation for integrally printing a plurality of objects to be printed on one page and a designation as to whether or not printing is made by including the front and rear portions of an object to be printed. Partial printing designation information further includes a designation as to whether or not a printed location is displayed in a simple fashion and a designation as to whether or not reference destination is displayed on each of the printed matter and the terminal display.

Next, in S1816 shown in FIG. 24, the CPU performs the same extraction processing for extracting an object targeted for partial printing as that described with reference to FIG. 11. In the present embodiment, the data conversion unit 311 executes extraction processing for extracting an object targeted for partial printing.

Next, in S1817, the CPU determines whether or not there is a preview designation for an object targeted for partial printing. If there is no preview designation for an object targeted for partial printing, the process advances to S1819. If there is a preview designation for an object targeted for partial printing, the process advances to S1818.

In S1818, the CPU displays the extracted object targeted for partial printing on the preview area 523 on the preview selection screen described with reference to FIG. 6D. The CPU determines an object targeted for partial printing in accordance with the input operation on the preview selection screen, and the process advances to S1820. On the other hand, in S1819, the CPU confirms all of the extracted objects targeted for partial printing as an object targeted for partial printing, and the process advances to S1820.

In S1820, the CPU performs the same partial print data generation processing as that described with reference to FIG. 15 and FIG. 16. In S1821, the generated print data is subject to print processing via a designated printer, and the process returns to S1802 shown in FIG. 23. The print processing is executed by the print data generating unit 312 of the portable terminal 310.

In the information processing system of the third embodiment, data conversion processing is performed in advance upon acquisition of document data by the portable terminal 310, so that an environment in which the document data is immediately and appropriately readable on the portable terminal can be achieved when a user wants to read the document data. In the present embodiment, the information processing system performs display by printing. The information processing system can also readily realize to generate data corresponding to another output device and display the generated data on the another output device.

Fourth Embodiment

In the fourth embodiment, the portable terminal itself stores document data, and converts document data when the document data is displayed thereon. Note that the hardware configuration of the devices constituting the information processing system of the fourth embodiment is the same as that of the devices described with reference to FIG. 1.

Figure 25:
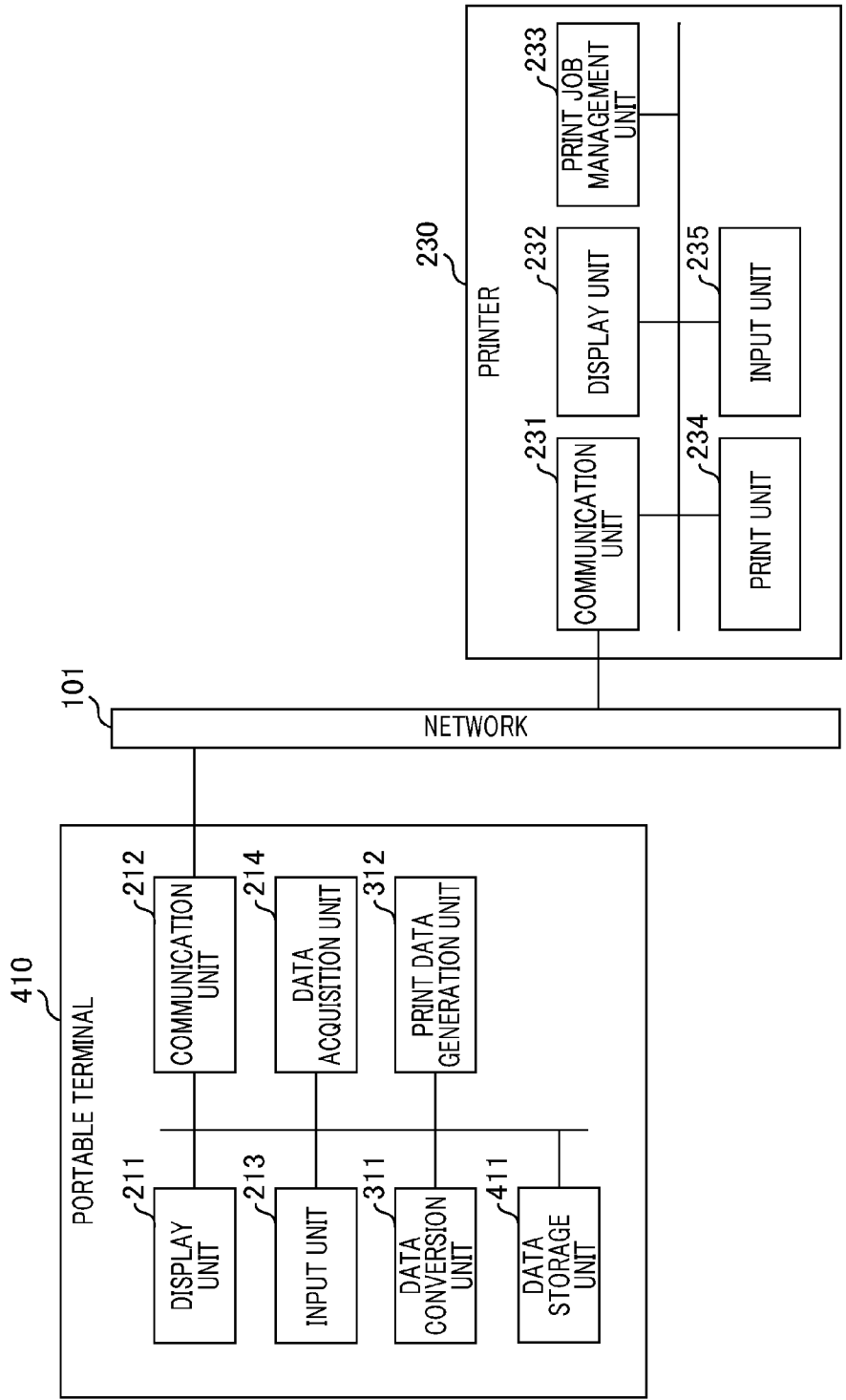
FIG. 25 illustrates an exemplary configuration of an information processing system according to a fourth embodiment.

FIG. 25 is a diagram illustrating an exemplary configuration of an information processing system according to a fourth embodiment. The information processing system includes a portable terminal 410 and a printer 230 that communicate with each other via the network 101. The printer 230 is the same as the printer 230 shown in FIG. 2. The portable terminal 410 includes a display unit 211, a communication unit 212, an input unit 213, a data acquiring unit 214, a data conversion unit 311, and a print data generating unit 312, and a data storage unit 411. The display unit 211, the communication unit 212, the input unit 213, and the data acquiring unit 214 are the same as the display unit 211, the communication unit 212, the input unit 213, and the data acquiring unit 214 that are provided in the portable terminal 210 shown in FIG. 2, respectively. Also, the data conversion unit 311 and the print data generating unit 312 are the same as the data conversion unit 311 and the print data generating unit 312 shown in FIG. 22, respectively. The data storage unit 411 stores document data. Note that the data conversion unit 311 converts document data upon displaying the document data.

In the present embodiment, the portable terminal 410 has document data display software. The document data display software is software that displays any document data on the portable terminal 410 by acquiring it from the storage device 113 storing document data. The document data display software is stored in the storage device 113 (FIG. 1) in advance and is loaded into the memory unit 112 and is executed by the CPU 111.

Figure 26A:
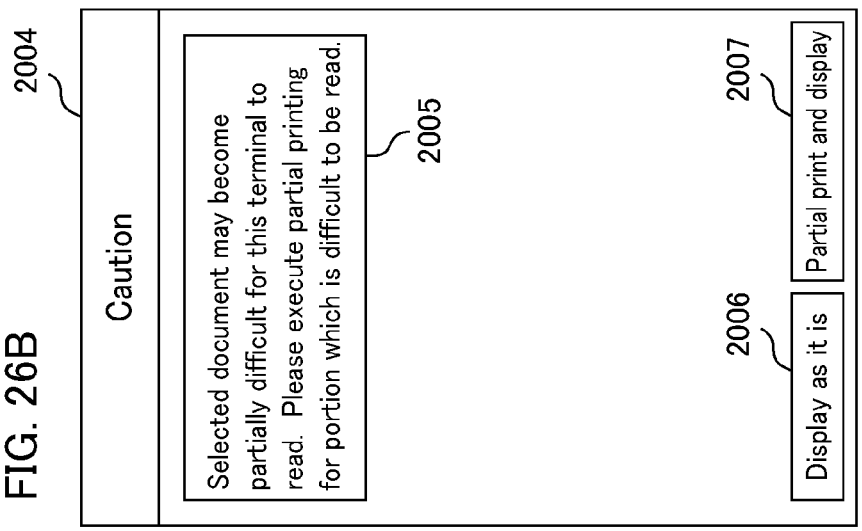
FIGS. 26A and 26B illustrate screens to be displayed upon execution of document data display software.
Figure 26B:
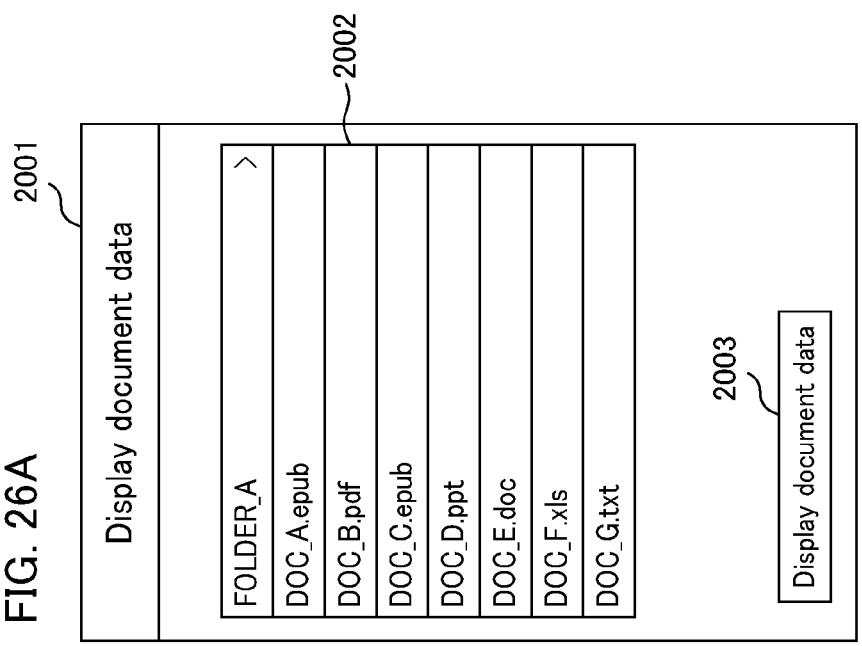

FIGS. 26A and 26B are diagrams illustrating screens to be displayed upon execution of document data display software. FIG. 26A shows a screen (document data display screen) for designating document data to be displayed. A document data display screen 2001 has a document data list 2002 and a document data display button 2003. The document data list 2002 is a document data list stored in the data storage unit 411. When a user selects document data desired to be displayed from among document data displayed on the document data list 2002, and then depresses the document data display button 2003, the processing in S2104 shown in FIG. 27 to be described below is performed.

FIG. 26B shows a screen (caution display screen) to be displayed by document data display software when target document may be difficult to be read on the portable terminal display after the document data display button is depressed.

A caution display screen 2004 has a caution message display field 2005, a directly display button 2006, and a partial printing display button 2007. A caution prompted to a user is displayed on the caution message display field 2005. In this example, a sentence for reporting the fact that target document may be difficult to be read on the portable terminal display, and thus, a portion which may be difficult to be read can be subject to partial printing is displayed on the caution message display field 2005.

The directly display button 2006 is a button which is used for designating direct display of document data. The partial printing display button 2007 is a button which is used for designating partial printing when a portion which may be difficult to be read is printed. When a user depresses the partial printing display button 2007, the document data display software displays the partial print setting screen 508 described with reference to FIG. 6C.

Figure 27:
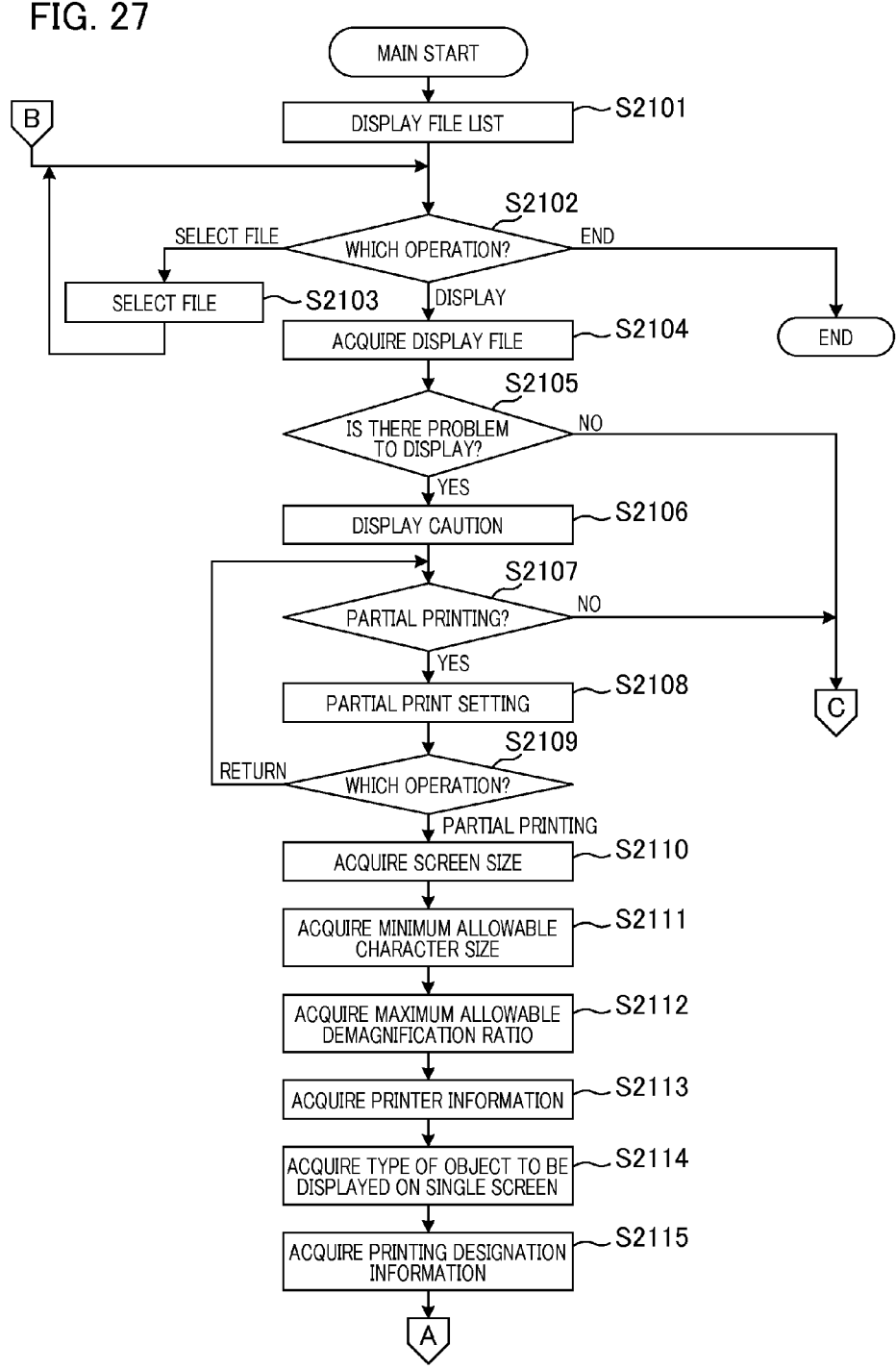
FIG. 27 is a flowchart illustrating operation processing performed by a portable terminal.
Figure 28:
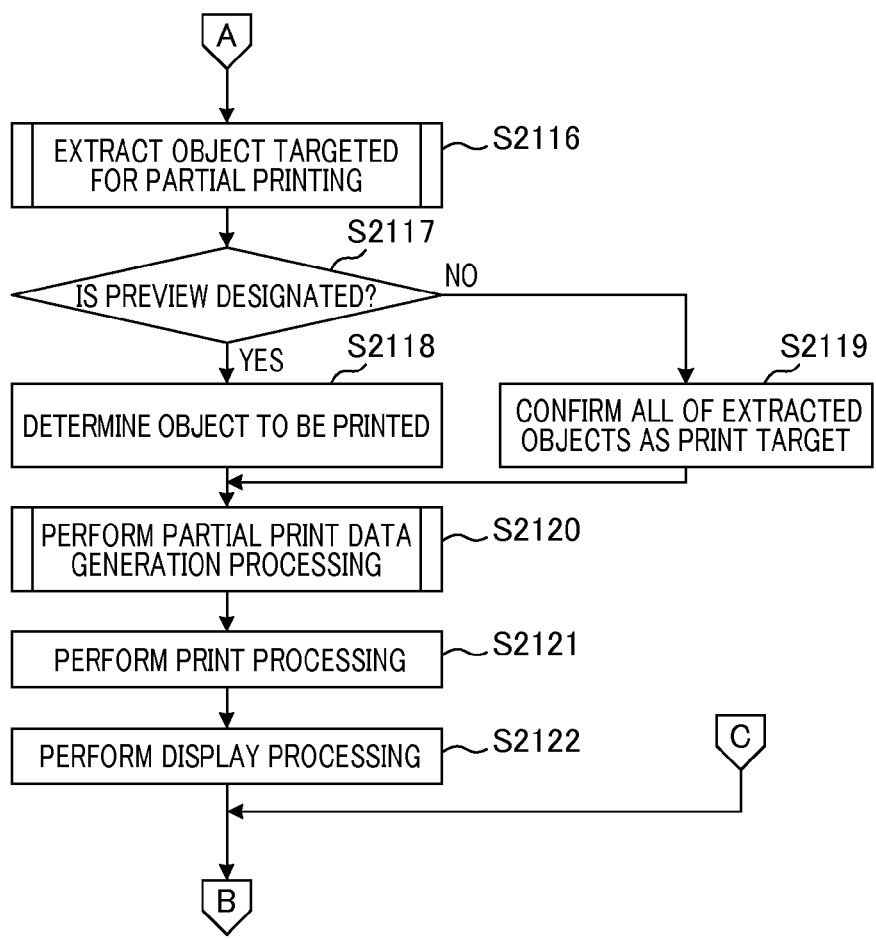
FIG. 28 is a flowchart illustrating operation processing performed by a portable terminal.

FIG. 27 and FIG. 28 are flowcharts illustrating operation processing performed by the portable terminal of the fourth embodiment. The document data display software stored in the storage device 113 is loaded into the memory unit 112 and is executed by the CPU 111. In this manner, the CPU 111 controls the memory unit 112, the storage device 113, the input device 114, the display device 115, and the network interface 116 to thereby perform the processing of the flowchart shown in FIG. 27 and FIG. 28.

Firstly, in S2101, the CPU obtains a document data list registered on the data storage unit 411 from the data storage unit 411, and then displays the document data list on the display unit 211. How the document data list is displayed on the display unit 211 is as described with reference to FIG. 26A. Next, in S2102, the CPU determines an input operation via the input unit 213. If the input operation is an ending operation, the process ends. If the input operation is a file selecting operation, the CPU stores the file name selected in S2103, and the process returns to S2102. If the input operation is a document data display operation, the process advances to S2104. Then, the CPU acquires document data from the data storage unit 217.

Next, in S2105, the CPU determines whether or not there is a possibility to be problematic for displaying the acquired document data on the portable terminal. The CPU determines whether or not the requested document file is a file targeted for partial printing using a file extension. In this example, the file targeted for partial printing is an EPUB file. If the file is a file targeted for partial printing, the CPU determines that there is a possibility to be problematic for displaying the acquired document data on the portable terminal, and the process advances to S2106. If the file is not a file targeted for partial printing, the CPU determines that there is no possibility to be problematic for displaying the acquired document data on the portable terminal, and the process returns to S2102.

In S2106, the CPU displays the caution display screen described with reference to FIG. 26B. Next, in S2107, the CPU determines whether or not an input designation is a designation for performing partial printing via the input unit 213. If the input designation is a designation not to perform partial printing, the process returns to S2102. If the input designation is a designation for performing partial printing, the process advances to S2108. Then, the CPU displays the partial print setting screen described with reference to FIG. 6C to thereby set various conditions.

Next, in S2109, the CPU determines an input operation. If the input operation is a return operation, the process returns to S2107. If the input operation is a partial printing execution designation, the process advances to S2110, and the CPU acquires screen size information of the portable terminal 410.

Next, in S2111, the CPU acquires minimum allowable character size information which is used for displaying an image on the portable terminal. Next, in S2112, the CPU acquires maximum allowable demagnification ratio information which is used for displaying an image on the portable terminal. Next, in S2113, the CPU acquires output printer information upon partial printing. Next, in S2114, the CPU acquires designation information for designating a target object to be displayed on a single screen on the portable terminal. The target object is one or a plurality of combinations of a table object, a graphic object, an image object, and a fixed layout object.

Next, in S2115, the CPU acquires partial printing designation information upon partial printing. Partial printing designation information includes a sheet size, a text character size upon printing, and a designation as to whether or not an object to be printed is printed in conformity to a sheet size. Partial printing designation information also includes a designation for integrally printing a plurality of objects to be printed on one page and a designation as to whether or not printing is made by including the front and rear portions of an object to be printed. Partial printing designation information further includes a designation as to whether or not a printed location is displayed in a simple fashion and a designation as to whether or not reference destination is displayed on each of the printed matter and the terminal display.

Next, in S2116 shown in FIG. 28, the CPU performs the same extraction processing for extracting an object targeted for partial printing as that described with reference to FIG. 11. In the present embodiment, the data conversion unit 311 executes extraction processing for extracting an object targeted for partial printing.

Next, in S2117, the CPU determines whether or not there is a preview designation for an object targeted for partial printing. If there is no preview designation for an object targeted for partial printing, the process advances to S2119. If there is a preview designation for an object targeted for partial printing, the process advances to S2118.

In S2118, the CPU displays the extracted object targeted for partial printing on the preview area 523 on the preview selection screen described with reference to FIG. 6D. The CPU determines an object targeted for partial printing in accordance with the input operation on the preview selection screen, and the process advances to S2120. On the other hand, in S2119, the CPU confirms all of the extracted objects targeted for partial printing as an object targeted for partial printing, and the process advances to S2120.

In S2120, the CPU performs the same partial print data generation processing as that described with reference to FIG. 15 and FIG. 16. In S2121, the generated print data is subject to print processing via a designated printer, and the process returns to S2102 shown in FIG. 27. The print processing is executed by the print data generating unit 312 of the portable terminal 410.

According to the aforementioned information processing system of the fourth embodiment, data conversion processing is executed upon display of document data, so that an environment in which the document data is appropriately readable on the portable terminal can be achieved without performing excess conversion processing for document data not to be displayed on the portable terminal. In the fourth embodiment, the information processing system performs display by printing. The information processing system can also readily realize to generate data corresponding to another output device and display the generated data on the another output device.

Aspects of the present invention can also be realized by a computer of a system or apparatus (or devices such as a the CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274864 filed on Dec. 17, 2012, which is hereby incorporated by reference herein in its entirety.

What is claimed is:

1. An information processing apparatus comprising:
 a size acquiring unit configured to acquire a size of an output medium to which an image based on document data including a plurality of objects is output;
 a condition acquiring unit configured to acquire an output condition of an image based on the document data;
 an extracting unit configured to extract an object to be output alone to the output medium from among the plurality of objects included in the document data on a basis of the acquired size and the acquired output condition; and
 a generating unit configured to generate, on a basis of the extracted object, output data for outputting an image of the extracted object alone to the output medium.

2. The information processing apparatus according to claim 1, wherein the generating unit further modifies a portion of the document data, the portion corresponding to the extracted object.

3. The information processing apparatus according to claim 2, wherein the generating unit generates another output data for outputting an image of the modified document image data output data to an output medium which is different from the output medium to which the image of the extracted object is output alone.

4. The information processing apparatus according to claim 1, further comprising:

a specifying unit configured to specify, from among the document data, one or more objects whose type match a type designated as a type of an object to be output alone to the output medium, wherein the designated type is at least one of a table object type, a graphic object type, an image object type, and a fixed-layout object type, and wherein the extracting unit extracts an object to be output alone to the output medium from among the specified objects on a basis of the acquired size and the acquired output condition.

5. The information processing apparatus according to claim 1, wherein the generated output data is printed on a sheet by a print device.

6. The information processing apparatus according to claim 1, wherein the size acquiring unit acquires sizes of a plurality of predefined output media, wherein the generating unit associates the extracted object with the each acquired sizes to generate the output data.

7. An information processing system comprising:

a size acquiring unit configured to acquire a size of an output medium to which an image based on document data including a plurality of objects is output;

a condition acquiring unit configured to acquire the output condition of an image based on the document data;

an extracting unit configured to extract an object to be output alone to the output medium from among the plurality of objects included in the document data on the basis of the acquired size and the acquired output condition; and a generating unit configured to generate, on a basis of the extracted object, output data for outputting an image of the extracted object alone to the output medium based on the extracted object.

8. The information processing system according to claim 7, wherein the generating unit further modifies a portion of the document data corresponding to the extracted object.

9. The information processing system according to claim 8, wherein the generating unit generates another output data for outputting an image of the modified document image data output data to an output medium which is different from the output medium to which the image of the extracted object is output alone.

10. The information processing system according to claim 7, further comprising:

a specifying unit configured to specify, from among the document data, one or more objects whose type match a type designated as a type of an object to be output alone to the output medium, wherein the designated type is at least one of a table object type, a graphic object type, an image object type, and a fixed-layout object type, and wherein the extracting unit extracts an object to be output alone to the output medium from among the specified objects on a basis of the acquired size and the acquired output condition.

11. The information processing system according to claim 7, wherein the generated output data is printed on a sheet by a print device.

12. The information processing system according to claim 7, wherein the size acquiring unit acquires sizes of a plurality of predefined output media, wherein the generating unit associates the extracted object with the each acquired sizes to generate the output data.

13. An information processing method comprising:

acquiring a size of an output medium to which an image based on document data including a plurality of objects is output;

acquiring an output condition of an image based on the document data;

extracting an object to be output alone to the output medium from among the plurality of objects included in the document data on a basis of the acquired size and the acquired output condition; and generating, on a basis of the extracted object, output data for outputting an image of the extracted object alone to the output medium based on the extracted object.

* * * * *